(12) United States Patent
Miyafuji et al.

(10) Patent No.: US 8,907,024 B2
(45) Date of Patent: Dec. 9, 2014

(54) CURABLE COMPOSITION

(75) Inventors: Kiyoshi Miyafuji, Takasago (JP); Ayako Yano, Takasago (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 13/989,116

(22) PCT Filed: Nov. 18, 2011

(86) PCT No.: PCT/JP2011/076618
§ 371 (c)(1),
(2), (4) Date: Jul. 2, 2013

(87) PCT Pub. No.: WO2012/070476
PCT Pub. Date: May 31, 2012

(65) Prior Publication Data
US 2013/0274410 A1    Oct. 17, 2013

(30) Foreign Application Priority Data

Nov. 24, 2010 (JP) ................................. 2010-261730

(51) Int. Cl.
| | | |
|---|---|---|
| C08L 71/02 | (2006.01) | |
| C09D 201/10 | (2006.01) | |
| C09J 183/16 | (2006.01) | |
| C08L 101/10 | (2006.01) | |

(52) U.S. Cl.
CPC ............. C08L 71/02 (2013.01); C09D 201/10 (2013.01); C09J 183/16 (2013.01); C08L 101/10 (2013.01)
USPC ............... 525/403; 106/287.13; 106/287.16; 525/409; 525/477; 528/35

(58) Field of Classification Search
None
See application file for complete search history.

(56) References Cited

U.S. PATENT DOCUMENTS

| | | | |
|---|---|---|---|
| 4,904,732 A | | 2/1990 | Iwahara et al. |
| 5,223,583 A | * | 6/1993 | Higuchi et al. ............ 525/404 |
| 5,464,888 A | * | 11/1995 | Owen ........................ 524/104 |
| 5,821,314 A | * | 10/1998 | Ikushima et al. ............ 528/18 |
| 2007/0015893 A1 | * | 1/2007 | Hakuta et al. ............... 528/34 |
| 2007/0173620 A1 | | 7/2007 | Kono |
| 2011/0098410 A1 | * | 4/2011 | Harumashi et al. ......... 525/100 |

FOREIGN PATENT DOCUMENTS

| | | |
|---|---|---|
| EP | 1832626 A1 | 9/2007 |
| EP | 1873208 A1 | 1/2008 |
| EP | 1939256 A1 | 7/2008 |
| JP | 52-073998 A | 6/1977 |
| JP | 55-129446 A | 10/1980 |
| JP | 63-006041 A | 1/1988 |
| JP | 2000-086881 A | 3/2000 |
| JP | 2001-26765 * | 1/2001 |
| JP | 2004-224985 A | 8/2004 |
| JP | 2005-082750 A | 3/2005 |
| JP | 2005-213446 A | 8/2005 |
| JP | 2011-063669 A | 3/2011 |
| WO | 2005/073322 A1 | 8/2005 |
| WO | WO 2009/133811 * | 11/2009 |

OTHER PUBLICATIONS

Registry information for Silyl Sat 30 (no date).*
International Search Report for PCT/JP2011/076618, mailing date of Feb. 21, 2012.
International Preliminary Report on Patentability (Form PCT/IB/373) of International Application No. PCT/JP2011/076618 dated Jun. 12, 2013, with Form PCT/ISA/237.

* cited by examiner

*Primary Examiner* — Marc Zimmer
(74) *Attorney, Agent, or Firm* — Westerman, Hattori, Daniels & Adrian, LLP

(57) ABSTRACT

An object of the present invention is to provide a curable composition that provides high hardness and can be used in adhesives and coating agents. This object can be achieved by a curable composition containing: 100 parts by weight of a reactive silyl group-containing organic polymer (A) that has a number average molecular weight of 2,000 to 6,000 and contains 1.3 to 5 reactive silyl groups per molecule; and 0 to 40 parts by weight of a plasticizer (C). This curable composition is suitable for flooring adhesives and tile adhesives, which require high hardness.

20 Claims, No Drawings

CURABLE COMPOSITION

TECHNICAL FIELD

The present invention relates to at least one organic polymer containing a silicon-containing group which contains a hydroxy or hydrolyzable group bonded to a silicon atom and can form a siloxane bond to be cross-linked (hereinafter referred to also as a "reactive silyl group"), and to a curable composition containing the organic polymer.

BACKGROUND ART

Organic polymers each containing at least one reactive silyl group per molecule are known to have a characteristic that they are cross-linked by siloxane bond formation involving hydrolysis or other reactions of the silyl group due to factors. such as moisture even at room temperature, whereby rubbery cured products are obtained.

Among such reactive silyl group-containing organic polymers, those whose backbone skeleton is a polyoxyalkylene polymer or a polyisobutylene polymer have already been produced industrially and are widely used in applications such as sealing materials, adhesives and paints (Patent Literature 1, Patent Literature 2).

In addition, the reactive silyl group-containing organic polymers with high molecular weights have been used in order to achieve excellent tensile properties. It has been necessary for curable compositions containing a high molecular weight polymer to incorporate a plasticizer in order to ensure workability. Meanwhile, high hardness may also be required depending on the particular application, and improved compositions are thus desired.

CITATION LIST

Patent Literature

Patent Literature 1: JP-A S52-73998
Patent Literature 2: JP-A S63-6041

SUMMARY OF INVENTION

Technical Problem

An object of the present invention is to provide a curable composition affording a high hardness cured product that has been inaccessible with the organic polymers heretofore used in sealing material compositions for general buildings.

Solution to Problem

As a result of intensive investigations in order to solve the problem identified above, the present inventors have found that a high hardness cured product can be obtained by using a reactive silyl group-containing organic polymer with a specific structure. The present invention has been completed based on this findings.

Specifically, the present invention relates to:
 (1). a curable composition, including:
100 parts by weight of a reactive silyl group-containing organic polymer (A) that has a number average molecular weight of 2,000 to 6,000 and contains 1.3 to 5 reactive silyl groups per molecule; and
0 to 40 parts by weight of a plasticizer (C);

(2). the curable composition according to (1), wherein the backbone skeleton of the reactive silyl group-containing organic polymer (A) is a polyoxyalkylene polymer;
 (3). the curable composition according to (1) or (2), wherein the backbone structure of the reactive silyl group-containing organic polymer (A) has at least one branch;
 (4). the curable composition according to any one of (1) to (3), wherein the reactive silyl group-containing organic polymer (A) contains 2 to 5 reactive silyl groups per molecule;
 (5). the curable composition according to any one of (1) to (4), which does not contain the plasticizer (C);
 (6). the curable composition according to any one of (1) to (5), wherein the composition includes a reactive silyl group-containing organic polymer (B) that has a number average molecular weight of 8,000 to 50,000 and contains 1.3 to 5 reactive silyl groups per molecule;
 (7). the curable composition according to (6), wherein the backbone skeleton of the reactive silyl group-containing organic polymer (B) is a polyoxyalkylene polymer;
 (8). an adhesive, containing the curable composition according to any one of (1) to (7);
 (9). a flooring adhesive, containing the curable composition according to any one of (1) to (7);
 (10). a tile adhesive, containing the curable composition according to any one of (1) to (5);
 (11). a tile adhesive, containing the curable composition according to any one of (6) and (7);
 (12). a coating agent, obtained by curing the curable composition according to any one of (1) to (7); and
 (13). a cured product, obtained by curing the curable composition according to any one of (1) to (7).

Advantageous Effects of Invention

The use of the reactive silyl group-containing organic polymer in the present invention provides a highly thixotropic curable composition and a high hardness cured product. In addition, the use leads to improvement in the cracking strength of brittle materials such as tiles.

DESCRIPTION OF EMBODIMENTS

Hereinafter, the present invention will be described in detail.

The backbone skeleton of the reactive silyl group-containing organic polymer (A) used in the present invention is not particularly limited and organic polymers having various backbone skeletons can be used. The backbone skeleton preferably contains at least one selection from a hydrogen atom, carbon atom, nitrogen atom, oxygen atom, and sulfur atom because this provides excellent curability and adhesiveness to the resulting composition.

Specific examples thereof include polyoxyalkylene polymers such as polyoxyethylene, polyoxypropylene, polyoxybutylene, polyoxytetramethylene, polyoxyethylene-polyoxypropylene copolymers, and polyoxypropylene-polyoxybutylene copolymers; hydrocarbon polymers such as ethylene-propylene copolymers, polyisobutylene, copolymers of isobutylene and isoprene or like monomers, polychloroprene, polyisoprene, copolymers of isoprene or butadiene with acrylonitrile and/or styrene or like monomers, polybutadiene, and copolymers of isoprene or butadiene with acrylonitrile and styrene or like monomers, and hydrogenated polyolefin polymers derived from hydrogenation of these polyolefin polymers; polyester polymers obtained by condensation of a dibasic acid such as adipic acid and a glycol, and obtained by ring-opening polymerization of lactones; (meth)acrylic acid ester polymers obtained by radical polymerization of monomers such as ethyl (meth)acrylate and butyl (meth)acrylate; vinyl polymers obtained by radical polymerization of monomers such as (meth)acrylic acid ester monomers, vinyl acetate, acrylonitrile and styrene; graft polymers obtained by polymerizing vinyl monomers in the presence of the aforementioned organic polymers; polysulfide polymers; polyamide polymers such as nylon 6 produced by ring-opening polymerization of ε-caprolactam, nylon 6/6 produced by polycondensation of hexamethylenediamine and adipic acid, nylon 6/10 produced by polycondensation of hexamethylenediamine and sebacic acid, nylon 11 produced by polycondensation of s-aminoundecanoic acid, nylon 12 produced by ring-opening polymerization of ε-aminolaurolactam, and copolymer nylons derived from at least two species of the aforementioned nylons; polycarbonate polymers produced by, for example, polycondensation of bisphenol A and carbonyl chloride, and diallyl phthalate polymers.

Preferred among these are saturated hydrocarbon polymers such as polyisobutylene, hydrogenated polyisoprene and hydrogenated polybutadiene; polyoxyalkylene polymers; and (meth)acrylic acid ester polymers. This is because these polymers have a relatively low glass transition temperature and give cured products that are excellent in cold resistance.

The glass transition temperature of the organic polymer (A) is not particularly limited, and is preferably 20° C. or lower, more preferably 0° C. or lower, and particularly preferably −20° C. or lower. The glass transition temperature of higher than 20° C. may lead to the composition having a high viscosity in winter or in cold districts and therefore poor workability, and may also result in the cured product with lower flexibility and therefore lower elongation properties. The glass transition temperature values are measured by DSC.

Polyoxyalkylene polymers and (meth)acrylic acid ester polymers are particularly preferred because they are high in moisture permeability, and are excellent in the depth curability when used in one-pack compositions, and in adhesion. Here, polyoxyalkylene polymers are most preferred. Polyoxypropylene polymers are particularly preferred among the polyoxyalkylene polymers.

The reactive silyl group present in the organic polymer in the present invention is a group that contains a hydroxy or hydrolyzable group bonded to a silicon atom and can undergo crosslinking through the formation of a siloxane bond by a reaction accelerated by a silanol condensation catalyst. The reactive silyl group may be a group represented by formula (1):

$$-SiR^1{}_{3-a}X_a \qquad (1)$$

wherein each $R^1$ is independently a C1 to C20 alkyl group, a C6 to O20 aryl group, a C7 to C20 aralkyl group, or a triorganosiloxy group represented by $-OSi(R')_3$ where each $R'$ is independently a C1 to C20 hydrocarbon group; each X is independently a hydroxy group or a hydrolyzable group; and a is an integer of 1 to 3.

The hydrolyzable group is not particularly limited, and may be any conventionally known hydrolyzable group. Specific examples thereof include a hydrogen atom, a halogen atom, an alkoxy group, an acyloxy group, a ketoxymate group, an amino group, an amido group, an acid amido group, an aminooxy group, a mercapto group, and an alkenyloxy group. Preferred among these are a hydrogen atom, an alkoxy group, an acyloxy group, a ketoxymate group, an amino group, an amido group, an aminooxy group, a mercapto group, and an alkenyloxy group. Particularly preferred is an alkoxy group, in terms of mild hydrolysis and easy workability.

From 1 to 3 hydrolyzable or hydroxy groups can be bonded to a single silicon atom. When two or more hydrolyzable or hydroxy groups are bonded per reactive silyl group, these groups may be the same as or differ from one another.

The value of a in formula (1) is preferably 2 or 3 from the standpoint of curability and in particular is preferably 3 when rapid curability is required, or is preferably 2 when storage stability is required.

Specific examples of $R^1$ in formula (1) include alkyl groups such as a methyl group and an ethyl group; cycloalkyl groups such as a cyclohexyl group; aryl groups such as a phenyl group; aralkyl groups such as a benzyl group; and triorganosiloxy groups represented by $-Oi(R')_3$ with R's each being a group such as a methyl group and a phenyl group. Among these, a methyl group is particularly preferred.

Specific examples of the reactive silyl group include a trimethoxysilyl group, a triethoxysilyl group, a triisopropoxysilyl group, a dimethoxymethylsilyl group, a diethoxymethylsilyl group, and a diisopropoxymethylsilyl group. Preferred are a trimethoxysilyl group, a triethoxysilyl group, and a dimethoxymethylsilyl group as they have high activity to achieve favorable curability. Particularly preferred is a trimethoxysilyl group. Also, a dimethoxymethylsilyl group and a triethoxysilyl group are particularly preferred in terms of storage stability. In addition, a triethoxysilyl group and a diethoxymethylsilyl group are particularly preferred because they give ethanol as the alcohol generated in connection with the hydrolysis reaction of the reactive silyl group, which means they have higher safety.

The reactive silyl group may be introduced by a conventionally known method. Specifically, some exemplary methods are mentioned below.

(I) An organic polymer containing a functional group such as a hydroxy group within the molecule is allowed to react with an organic compound containing an unsaturated group and an active group that is reactive with the functional group to provide an unsaturated group-containing organic polymer. Alternatively, the functional group-containing organic polymer is allowed to copolymerize with an unsaturated group-containing epoxy compound to provide an unsaturated group-containing organic polymer. Then, the reaction product is allowed to react with a reactive silyl group-containing hydrosilane for hydrosilylation.

(II) An unsaturated group-containing organic polymer obtained in the same manner as in the method (I) is allowed to react with a compound containing a mercapto group and a reactive silyl group.

(III) An organic polymer containing a functional group such as a hydroxy group, an epoxy group or an isocyanato group within the molecule is allowed to react with a compound containing a reactive silyl group and a functional group that is reactive with the former functional group.

Preferred among these is the method (I), or the method (III) in such a mode that a hydroxy-terminated polymer is allowed to react with a compound containing an isocyanato group and a reactive silyl group because these methods achieve a high conversion rate in a relatively short reaction time. Moreover, particularly preferred is the method (I) because the curable composition containing the reactive silyl group-containing organic polymer produced by the method (I) has lower viscosity than that in the case of using the organic polymer produced by the method (III), and thus has better workability, and also because the organic polymer produced by the method (II) has a strong odor due to mercaptosilane.

Specific examples of the hydrosilane compound used in the method (I) include, but not limited to, halogenated silanes such as trichlorosilane, methyldichlorosilane, dimethylchlorosilane and phenyldichlorosilane; alkoxysilanes such as trimethoxysilane, triethoxysilane, methyldiethoxysilane, methyldimethoxysilane, phenyldimethoxysilane, and 1-[2-(trimethoxysilyl)ethyl]-1,1,3,3-tetramethyldisiloxane; acyloxysilanes such as methyldiacetoxysilane and phenyldiacetoxysilane; and ketoxymatesilanes such as bis(dimethylketoxymate)methylsilane and bis(cyclohexylketoxymate)methylsilane. Among these, in particular, halogenated silanes and alkoxysilanes are preferred. Most preferred are, in particular, alkoxysilanes because curable compositions to be provided therefrom are mildly hydrolyzed and are easy to handle. Preferred among the alkoxysilanes is methyldimethoxysilane because it is easily available and provides high curability, storage stability, elongation properties and tensile strength to a curable composition containing the resulting organic polymer. In terms of the curability of the curable composition to be provided and the recovery, trimethoxysilane is particularly preferred.

The synthesis method (II) may be, but not limited to, a method of introducing a compound containing a mercapto group and a reactive silyl group into an unsaturated bond moiety of an organic polymer by radical addition reaction in the presence of a radical initiator and/or a radical generation source. Specific examples of the compound containing a mercapto group and a reactive silyl group include, but not limited to, γ-mercaptopropyltrimethoxysilane, γ-mercaptopropylmethyldimethoxysilane, γ-mercaptopropyltriethoxysilane, γ-mercaptopropylmethyldiethoxysilane, mercaptomethyltrimethoxysilane, and mercaptomethyltriethoxysilane.

The synthesis method (III) in which a hydroxy-terminated polymer is allowed to react with a compound containing an isocyanato group and a reactive silyl group may be, but not limited to, a method as disclosed in JP-A H03-47825. Specific examples of the compound containing an isocyanato group and a reactive silyl group include, but not limited to, γ-isocyanatopropyltrimethoxysilane, γ-isocyanatopropylmethyldimethoxysilane, γ-isocyanatopropyltriethoxysilane, γ-isocyanatopropylmethyldiethoxysilane, isocyanatomethyltrimethoxysilane, isocyanatomethyltriethoxysilane, isocyanatomethyldimethoxymethylsilane, and isocyanatomethyldiethoxymethylsilane.

In the case of a silane compound in which three hydrolyzable groups are bonded to one silicon atom, such as trimethoxysilane, disproportionation may proceed. As the disproportionation proceeds, unstable compounds such as dimethoxysilane may be generated, thereby making it difficult to handle. In the case of γ-mercaptopropyltrimethoxysilane or γ-isocyanatopropyltrimethoxysilane, however, such disproportionation will not proceed. Thus, the synthesis method (II) or (III) is preferred in the case that a group in which three hydrolyzable groups are bonded to one silicon atom, such as a trimethoxysilyl group, is used as the silyl group.

On the other hand, disproportionation will not proceed in the case of a silane compound represented by formula (2):

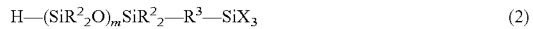

$$H-(SiR^2{}_2O)_m SiR^2{}_2-R^3-SiX_3 \quad (2)$$

wherein X is defined as mentioned above; (2m+2) $R^2$s each independently are a hydrocarbon group, and each are preferably a C1 to C20 hydrocarbon group, more preferably a C1 to C8 hydrocarbon group, and particularly preferably a C1 to C4 hydrocarbon group, in terms of availability and cost; $R^3$ is a divalent organic group, and is preferably a C1 to C12 divalent hydrocarbon group, more preferably a C2 to C8 divalent hydrocarbon group, and particularly preferably a C2 divalent hydrocarbon group, in terms of availability and cost; and m is an integer of 0 to 19, and is preferably 1 in terms of availability and cost. For this reason, the silane compound represented by formula (2) is preferably used in the case of introducing a group in which three hydrolyzable groups are bonded to one silicon atom, by the synthesis method (I). Specific examples of the silane compound represented by formula (2) include
1-[2-(trimethoxysilyl)ethyl]-1,1,3,3-tetramethyldisiloxane,
1-[2-(trimethoxysilyl)propyl]-1,1,3,3-tetramethyldisiloxane, and
1-[2-(trimethoxysilyl)hexyl]-1,1,3,3-tetramethyldisiloxane.

The reactive silyl group-containing organic polymer (A) may be linear or branched and has a number average molecular weight determined relative to polystyrene standards by GPC of about 2,000 to 6,000, more preferably 2,000 to 5,500, and particularly preferably 2,000 to 5,000. The number average molecular weight of less than 2,000 leads to undesirable trends in the tensile properties of the cured product, whereas the number average molecular weight of more than 6,000 tends to cause a decline in hardness.

The number average molecular weight of the reactive silyl group-containing organic polymer (A) is defined as the molecular weight (terminal group-based molecular weight) corresponding to the number average molecular weight determined in view of the structure of the organic polymer (the degree of branching which depends on the polymerization initiator used) by directly measuring the terminal group concentration by titrimetric analysis according to the principles of the method for measuring the hydroxyl value in accordance with JIS K 1557 and the method for measuring the iodine value in accordance with JIS K 0070.

In order to perform a relative measurement of the number average molecular weight of the reactive silyl group-containing organic polymer (A), a calibration curve can be constructed between the terminal group-based molecular weight mentioned above and the number average molecular weight (GPC-based molecular weight) determined relative to polystyrene standards by ordinary GPC measurement on the organic polymer precursor, to convert the GPC-based molecular weight of the reactive silyl group-containing organic polymer (P) to the terminal group-based molecular weight.

In order to obtain a high hardness rubbery cured product, the organic polymer (A) preferably contains on average 1.3 to 5, more preferably 1.3 to 3, and particularly preferably 2.1 to 3 reactive silyl groups per molecule of the polymer. If the number of reactive silyl groups in the molecule is less than 1.3 on average, the curability is unsatisfactory and a low hardness cured product will be formed. The reactive silyl group may reside at a terminal of the molecular chain backbone of the organic polymer or may reside at a terminal of a side chain or may reside at both positions. In particular, when the reactive silyl group resides only at a terminal of the molecular chain backbone, the finally formed cured product has an increased effective network size of the organic polymer component, which means that a rubbery cured product having high strength and high elongation can readily be obtained.

The number of reactive silyl groups is defined as a value given by determining the ratio of these groups to the molecular chain terminal groups by $^1$H-NMR and then taking into account the structure of the organic polymer (the degree of branching which depends on the polymerization initiator used).

The backbone structure of the reactive silyl group-containing organic polymer (A) preferably has at least one branch in order to obtain a high hardness cured product.

The aforementioned polyoxyalkylene polymers are polymers substantially having a repeating unit represented by formula (3):

wherein $R^4$ is a C1 to C14 linear or branched alkylene group, and the $R^4$ in formula (3) is preferably a C1 to C14, more preferably a C2 to C4, linear or branched alkylene group. Specific examples of the repeating unit represented by formula (3) include: —CH$_2$O—, —CH$_2$CH$_2$O—, —CH$_2$CH(CH$_3$)$_2$O—, —CH$_2$CH(C2H$_5$)O—, —CH$_2$C(CH$_3$)$_2$O—, and —CH$_2$CH$_2$CH$_2$CH$_2$O—. The backbone skeleton of the polyoxyalkylene polymer may be composed of just one species of repeating unit or may be composed of two or more species of repeating units. Particularly for use in sealants and the like, the backbone skeleton is preferably formed of a polymer mainly including a propylene oxide polymer because it is noncrystalline and has a relatively low viscosity.

Examples of the method for synthesizing a polyoxyalkylene polymer include, but not limited to, a polymerization method using an alkali catalyst such as KOH; a polymerization method using a transition metal compound-porphyrin complex catalyst such as a complex obtained by reaction between an organoaluminum compound and a porphyrin, as disclosed in JP-A S61-215623; a polymerization method using a double metal cyanide complex catalyst, as disclosed in JP-B S46-27250 and JP-B S59-15336 and U.S. Pat. Nos. 3,278,457, 3,278,458, 3,278,459, 3,427,256, 3,427,334 and 3,427,335, and other documents; a polymerization method using a catalyst containing a polyphosphazene salt, as disclosed in JP-A H10-273512; and a polymerization method using a catalyst containing a phosphazene compound, as disclosed in JP-A H11-060722.

Examples of the method for producing a polyoxyalkylene polymer containing a reactive silyl group include, but not limited to, methods disclosed in JP-B S45-36319, JP-B S46-12154, JP-A S50-156599, JP-A S54-6096, JP-A S55-13767, JP-A S55-13468 and JP-A S57-164123, JP-B H03-2450, and U.S. Pat. Nos. 3,632,557, 4,345,053, 4,366,307, and 4,960, 844, and other documents; and methods disclosed in JP-A S61-197631, JP-A S61-215622, JP-A S61-215623, JP-A S61-218632, JP-A H03-72527, JP-A H03-47825, and JP-A H08-231707, which can provide polyoxyalkylene polymers with a high molecular weight and a narrow molecular weight distribution, namely, with a number average molecular weight of 6,000 or higher and Mw/Mn of 1.6 or less.

Each of the reactive silyl group-containing polyoxyalkylene polymers may be used alone, or two or more of the polymers may be used in combination.

The saturated hydrocarbon polymers mentioned above are polymers that are substantially free from any unsaturated carbon-carbon bonds except for aromatic rings. The polymers forming the skeletons of these polymers can be obtained, for example, by (1) polymerizing as a main monomer a C2 to C6 olefin compound such as ethylene, propylene, 1-butene or isobutylene, or by (2) homopolymerizing a diene compound such as butadiene or isoprene or copolymerizing such a diene compound with the olefin compound, and then hydrogenating the resulting polymer. Here, isobutylene polymers and hydrogenated polybutadiene polymers are preferred because they allow easy introduction of a functional group into their terminal, easy control of the molecular weight, and increase in the number of terminal functional groups. Isobutylene polymers are particularly preferred.

Those whose backbone skeleton is a saturated hydrocarbon polymer are characteristically excellent in heat resistance, weather resistance, durability, and moisture barrier properties.

All the monomer units of the isobutylene polymer may be isobutylene units, or alternatively, the isobutylene polymer may be a copolymer with another monomer. In terms of the rubber properties, the polymer preferably has 50% by weight or more, more preferably 80% by weight or more, and particularly preferably 90 to 99% by weight, of repeating units derived from isobutylene.

Various polymerization methods have been conventionally proposed as the method for synthesizing a saturated hydrocarbon polymer. In particular, many methods of so-called living polymerization have been developed in recent years. The saturated hydrocarbon polymers, especially isobutylene polymers, may be easily produced by inifer polymerization found by Kennedy et al. (J. P. Kennedy et al., J. Polymer Sci., Polymer Chem. Ed., 1997, Vol. 15, p. 2843). This method is known to allow the production of polymers having a molecular weight of about 500 to 100,000 with a molecular weight distribution of 1.5 or less and the introduction of various functional groups into the molecular terminal.

Examples of the method for producing a saturated hydrocarbon polymer containing a reactive silyl group include, but not limited to, methods disclosed in JP-B H04-69659, JP-B H07-108928, JP-A S63-254149, JP-A S64-22904, JP-A H01-197509, Japanese Patent Nos. 2539445 and 2873395, and JP-A H07-53882.

Each of the reactive silyl group-containing saturated hydrocarbon polymers may be used alone, or two or more of these may be used in combination.

The (meth)acrylic acid ester monomers forming the backbones of the (meth)acrylic acid ester polymers mentioned above are not particularly limited and various monomers may be used. Examples thereof include (meth)acrylate monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluoyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, γ-(methacryloyloxypropyl)dimethoxymethylsilane, methacryloyloxymethyltrimethoxysilane, methacryloyloxymethyltriethoxysilane, methacryloyloxymethyldimethoxymethylsilane, methacryloyloxymethyldiethoxymethylsilane, and (meth)acrylic acid-ethylene oxide adducts.

The (meth)acrylic acid ester polymers include copolymers of such a (meth)acrylic acid ester monomer and a vinyl monomer as mentioned below. Examples of the vinyl monomer include: styrene monomers such as styrene, vinyltoluene, α-methylstyrene, chlorostyrene, and styrenesulfonic acid and salts thereof; silicon-containing vinyl monomers such as vinyltrimethoxysilane and vinyltriethoxysilane; maleic anhydride, maleic acid, and monoalkyl or dialkyl esters of maleic acid; fumaric acid, and monoalkyl or dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amido group-containing vinyl monomers such as acrylamide and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; and vinyl chloride, vinylidene chloride, allyl chloride, and allyl alcohol.

Each of these may be used alone, or a plurality of these may be copolymerized. Among these, in terms of the physical properties of the resulting product, preferred are polymers derived from a styrene monomer or a (meth)acrylate monomer, more preferred are (meth)acrylic polymers derived from an acrylic acid ester monomer or a methacrylic acid ester monomer, and particularly preferred are acrylic polymers derived from an acrylic acid ester monomer. In general building applications and the like where the composition is required to have low viscosity and the cured product thereof is required to have physical properties such as low modulus, high elongation, weather resistance, and heat resistance, butyl acrylate monomer is more preferably used. Meanwhile, in applications that require properties including oil resistance, such as automotive applications, a copolymer mainly derived from ethyl acrylate is more preferably used. The polymer mainly derived from ethyl acrylate is likely to be slightly poor in low-temperature properties (cold resistance) though having excellent oil resistance. In order to improve the low-temperature properties, some ethyl acrylate monomers may be replaced with butyl acrylate monomers. As the proportion of butyl acrylate increases, however, the good oil resistance is likely to be impaired. Hence, in applications requiring oil resistance, the proportion of the monomer is preferably 40% or lower, and more preferably 30% or lower. In order to improve the properties such as low-temperature properties without impairing the oil resistance, it is also preferable to use a monomer in which an oxygen atom has been introduced into a side-chain alkyl group, such as 2-methoxyethyl acrylate and 2-ethoxyethyl acrylate. Here, the introduction of the alkoxy group having an ether bond at a side chain is likely to cause poor heat resistance. Hence, the proportion of the monomer is preferably 40% or lower in the case where heat resistance is required for use. Thus, suitable polymers can be obtained by varying the monomer proportion in consideration of required physical properties such as oil resistance, heat resistance, and low-temperature properties, according to particular uses and requirements. For example, without any limitative meaning, mention may be made of copolymers of ethyl acrylate, butyl acrylate and 2-methoxyethyl acrylate (weight ratio: 40-50/20-30/30-20) which have an excellent balance between physical properties including oil resistance, heat resistance, and low-temperature properties. In the present invention, such a preferred monomer may be copolymerized or even block-copolymerized with another monomer. In this case, such a preferred monomer is preferably contained at 40% by weight or more. It should be noted that the term "(meth)acrylic acid" or similar terms as used herein refers to "acrylic acid and/or methacrylic acid".

The (meth)acrylic acid ester polymer can be synthesized by any methods such as conventionally known methods. However, ordinary free radical polymerization, in which a compound such as an azo compound or a peroxide is used as the polymerization initiator, is disadvantageously likely to provide a polymer having a molecular weight distribution value typically as large as 2 or greater and having high viscosity. Hence, living radical polymerization is preferred in order to produce a (meth)acrylic acid ester polymer having a narrow molecular weight distribution and low viscosity and also having a cross-linkable functional group at a molecular chain terminal at a high ratio.

A more preferred method for producing a (meth)acrylic acid ester polymer containing a specific functional group is "atom transfer radical polymerization," in which (meth)acrylic acid ester monomers are polymerized using an initiator such as an organic halide or a sulfonyl halide compound in the presence of a transition metal complex catalyst, among the "living radical polymerization" methods. This is because the atom transfer radical polymerization provides a polymer terminated with a halogen or a like group which is relatively advantageous to functional-group exchange reactions, and gives a high degree of freedom in terms of the design of the initiator and the catalyst, as well as having the characteristics of the "living radical polymerization". Examples of the atom transfer radical polymerization include a method described in Matyjaszewski et al., Journal of the American Chemical Society (J. Am. Chem. Soc.), 1995, vol. 117, p. 5614.

Examples of the method for producing a reactive silyl group-containing (meth)acrylic acid ester polymer include, but not limited to, a method that involves free radical polymerization with a chain transfer agent, as disclosed in JP-B H03-14068, JP-B H04-55444, JP-A H06-211922, and other documents; and a method that involves atom transfer radical polymerization, as disclosed in JP-A H09-272714 and other documents. One species of the reactive silyl group-containing (meth)acrylic acid ester polymers may be used alone, or two or more species thereof may be used in combination.

Each of the reactive silyl group-containing organic polymers mentioned above may be used alone, or two or more of these may be used in combination. Specifically, an organic polymer prepared as a blend of two or more polymers selected from the group consisting of reactive silyl group-containing polyoxyalkylene polymers, reactive silyl group-containing saturated hydrocarbon polymers, and reactive silyl group-containing (meth)acrylic acid ester polymers may be used.

Examples of the method for producing the organic polymer as a blend of a reactive silyl group-containing polyoxyalkylene polymer and a reactive silyl group-containing (meth)acrylic acid ester polymer include, but not limited to, those proposed in JP-A S59-122541, JP-A S63-112642, JP-A H06-172631, JP-A H11-116763, and other documents. A preferred exemplary specific production method includes blending a reactive silyl group-containing polyoxyalkylene polymer with a copolymer which contains a reactive silyl group and whose molecular chains substantially have a (meth)acrylic acid ester monomer unit containing a C1 to C8 alkyl group represented by formula (4):

$$—CH_2—C(R^5)(COOR^6)— \qquad (4)$$

wherein $R^5$ is a hydrogen atom or a methyl group, and $R^6$ is a C1 to C8 alkyl group, and a (meth)acrylic acid ester monomer unit containing a C9 or higher alkyl group represented by formula (5):

$$—CH_2—C(R^5)(COOR^7)— \qquad (5)$$

wherein $R^5$ is defined as mentioned above, and $R^7$ is a C9 or higher alkyl group.

Examples of $R^6$ in formula (4) include C1 to C8, preferably C1 to C4, and more preferably C1 or C2 alkyl groups such as a methyl group, an ethyl group, a propyl group, an n-butyl group, a t-butyl group, and a 2-ethylhexyl group. For $R^6$s, a single alkyl group may be used alone, or two or more alkyl groups may be used in admixture.

Examples of $R^7$ in formula (5) include long-chain alkyl groups having 9 or more carbon atoms, typically 10 to 30 carbon atoms, preferably 10 to 20 carbon atoms, such as a nonyl group, a decyl group, a lauryl group, a tridecyl group, a cetyl group, a stearyl group, and a behenyl group. For $R^7$s, a single alkyl group may be used alone, or two or more alkyl groups may be used in admixture, as in the case of $R^6$.

The molecular chains of this (meth)acrylic acid ester polymer substantially has the monomer units of formulas (4) and (5). The term "substantially" herein means that the total amount of the monomer units of formulas (4) and (5) in the copolymer is more than 50% by weight. The total amount of the monomer units of formulas (4) and (5) is preferably 70% by weight or more.

The ratio between the monomer units of formulas (4) and (5) is preferably 95:5 to 40:60, and more preferably 90:10 to 60:40 by weight ratio.

Examples of monomer units that may be contained in the copolymer, other than the ones of formulas (4) and (5), include monomer units derived from: acrylic acids such as acrylic acid and methacrylic acid; amide group-containing monomers such as acrylamide, methacrylamide, N-methylolacrylamide, and N-methylolmethacrylamide; epoxy group-containing monomers such as glycidyl acrylate and glycidyl methacrylate; amino group-containing monomers such as diethylaminoethyl acrylate, diethylaminoethyl methacrylate, and aminoethyl vinyl ether; and other monomers such as acrylonitrile, styrene, α-methylstyrene, alkyl vinyl ethers, vinyl chloride, vinyl acetate, vinyl propionate, and ethylene.

Some examples of the organic polymer prepared as a blend of a reactive silyl group-containing saturated hydrocarbon polymer and a reactive silyl group-containing (meth)acrylic acid ester polymer are disclosed in, for example, but not limited to, JP-A H01-168764 and JP-A 2000-186176.

Moreover, organic polymers prepared as a blend with a reactive silyl group-containing (meth)acrylic acid ester polymer may also be produced by polymerization of a (meth) acrylic acid ester monomer in the presence of a reactive silyl group-containing organic polymer. Such production methods are specifically disclosed in, for example, but not limited to, JP-A S59-78223, JP-A S59-168014, JP-A S60-228516, and JP-A S60-228517.

Meanwhile, the organic polymer may contain other components such as a urethane bond-containing component in the backbone skeleton, as long as they will not greatly impair the effects of the present invention.

The urethane bond-containing component is not particularly limited, and examples thereof include groups formed by reaction between an isocyanato group and an active hydrogen group (hereinafter, also referred to as amide segments).

The amide segments are groups represented by formula (6):

$$-NR^8-C(=O)- \quad (6)$$

wherein $R^8$ represents an organic group or a hydrogen atom.

Specific examples of the amide segments include a urethane group formed by reaction between an isocyanate group and a hydroxy group; a urea group formed by reaction between an isocyanate group and an amino group; and a thiourethane group formed by reaction between an isocyanate group and a mercapto group. In the present invention, the groups of formula (6) also include groups formed by further reaction of active hydrogen in the urethane group, urea group or thiourethane group with an isocyanate group.

Examples of industrially convenient methods for the production of an organic polymer containing an amide segment and a reactive silyl group include a production method including reacting an organic polymer terminated with an active hydrogen-containing group with an excessive amount of a polyisocyanate compound to give a polymer having an isocyanate group at a terminal of the polyurethane backbone, and thereafter, or simultaneously, reacting all or a part of the isocyanate groups with the group W of a silicon compound represented by formula (7):

$$W-R^9-SiR^1{}_{3-a}X_a \quad (7)$$

wherein $R^1$, X and a are defined as mentioned above; $R^9$ is a divalent organic group, preferably a C1 to C20 hydrocarbon group; W is an active hydrogen-containing group selected from a hydroxy group, a carboxy group, a mercapto group, and a (primary or secondary) amino group. Known production methods of organic polymers in connection with this production method include ones disclosed in JP-B S46-12154 (U.S. Pat. No. 3,632,557), JP-A S58-109529 (U.S. Pat. No. 4,374,237), JP-A S62-13430 (U.S. Pat. No. 4,645,816), JP-A H08-53528 (EP 0676403), JP-A H10-204144 (EP 0831108), JP-T 2003-508561 (U.S. Pat. No. 6,197,912), JP-A H06-211879 (U.S. Pat. No. 5,364,955), JP-A H10-53637 (U.S. Pat. No. 5,756,751), JP-A H11-100427, JP-A 2000-169544, JP-A 2000-169545, JP-A 2002-212415, Japanese Patent No. 3313360, U.S. Pat. Nos. 4,067,844, and 3,711,445, and JP-A 2001-323040.

Mention may also be made of organic polymers produced by reacting an organic polymer terminated with an active hydrogen-containing group with a reactive silyl group-containing isocyanate compound represented by formula (8):

$$O=C=N-R^9-SiR^1{}_{3-a}X_a \quad (8)$$

wherein $R^9$, $R^1$, X and a are defined as mentioned above. Known production methods of organic polymers in connection with this production method include ones disclosed in JP-A H11-279249 (U.S. Pat. No. 5,990,257), JP-A 2000-119365 (U.S. Pat. No. 6,046,270), JP-A S58-29818 (U.S. Pat. No. 4,345,053), JP-A H03-47825 (U.S. Pat. No. 5,068,304), JP-A H11-60724, JP-A 2002-155145, JP-A 2002-249538, WO 03/018658, and WO 03/059981.

Examples of the organic polymer terminated with an active hydrogen-containing group include hydroxy group-terminated oxyalkylene polymers (polyether polyols), polyacrylic polyols, polyester polyols, hydroxy group-terminated saturated hydrocarbon polymers (polyolefin polyols), polythiol compounds, and polyamine compounds. Among these, polyether polyols, polyacrylic polyols, and polyolefin polyols are preferred because they can provide organic polymers having a relatively low glass transition temperature and the cured products thereof are excellent in cold resistance. Especially, polyether polyols are particularly preferred as they can provide organic polymers having good depth curability and adhesiveness and also having low viscosity to give favorable workability. Polyacrylic polyols and saturated hydrocarbon polymers mentioned above are also more preferred because they can provide organic polymers affording cured products with good weather resistance and heat resistance.

As the polyether polyol, polyether polyols produced by any production methods may be used, and the polyether polyol is preferably terminated with at least 0.7 hydroxy groups per molecular terminal as an average of all the molecules. Specific examples thereof include oxyalkylene polymers produced with use of a conventional alkali metal catalyst, and oxyalkylene polymers produced by reacting an alkylene oxide using an initiator having at least two hydroxy groups, such as a polyhydroxy compound, in the presence of a double metal cyanide complex or cesium.

Among the polymerization methods mentioned above, the polymerization methods using a double metal cyanide complex are preferred because they allow production of oxyalkylene polymers having a lower degree of unsaturation, narrow Mw/Mn, lower viscosity, high acid resistance, and high weather resistance.

Examples of the polyacrylic polyols include polyols whose skeleton is an alkyl (meth)acrylate (co)polymer and which contain a hydroxy group within the molecule. These polymers are preferably synthesized by living radical polymerization, more preferably by atom transfer radical polymerization because these methods allow production of polymers having a narrow molecular weight distribution and low viscosity. In addition, the use is preferred of a polymer obtained by the continuous bulk polymerization of an alkyl acrylate monomer at high temperature and high pressure, that is, by the so-called SGO process, as described in JP-A 2001-207157. Specific examples include ARUFON UH-2000 from Toagosei Co., Ltd.

Specific examples of the polyisocyanate compound mentioned above include aromatic polyisocyanates such as toluene (tolylene) diisocyanate, diphenylmethane diisocyanate, and xylylene diisocyanate; and aliphatic polyisocyanates such as isophorone diisocyanate and hexamethylene diisocyanate.

The above silicon compound of formula (7) is not particularly limited, and specific examples thereof include amino group-containing silanes such as γ-aminopropyltrimethoxysilane, N-(β-aminoethyl)-γ-aminopropyltrimethoxysilane, (N-phenyl)-γ-aminopropyltrimethoxysilane, N-ethylaminoisobutyltrimethoxysilane, N-cyclohexylaminomethyltriethoxysilane, N-cyclohexylaminomethyldiethoxymethylsilane, and N-phenylaminomethyltrimethoxysilane; hydroxy group-containing silanes such as γ-hydroxypropyltrimethoxysilane; and mercapto group-containing silanes such as γ-mercaptopropyltrimethoxysilane. Also usable as the silicon compound of formula (7) are Michael addition products prepared from various α,β-unsaturated carbonyl compounds and primary amino group-containing silanes, and Michael addition products prepared from various (meth)acryloyl group-containing silanes and primary amino group-containing compounds, as disclosed in JP-A H06-211879 (U.S. Pat. No. 5,364,955), JP-A H10-53637 (U.S. Pat. No. 5,756,751), JP-A H10-204144 (EP 0831108), JP-A 2000-169544, and JP-A 2000-169545.

The above reactive silyl group-containing isocyanate compound of formula (8) is not particularly limited, and specific examples thereof include γ-trimethoxysilylpropyl isocyanate, γ-triethoxysilylpropyl isocyanate, γ-methyldimethoxysilylpropyl isocyanate, γ-methyldiethoxysilylpropyl isocyanate, trimethoxysilylmethyl isocyanate, triethoxymethylsilylmethyl isocyanate, dimethoxymethylsilylmethyl isocyanate, and diethoxymethylsilylmethyl isocyanate. Also usable as the reactive silyl group-containing isocyanate compound of formula (8) are compounds obtained by reacting the silicon compound of formula (7) with an excessive amount of the polyisocyanate compound mentioned above, as disclosed in JP-A 2000-119365 (U.S. Pat. No. 6,046,270).

The organic polymers obtained by the above-described methods contain a group represented by formula (9) in the backbone skeleton:

$$—NR^{10}—C(=O)— \quad (9)$$

wherein $R^{10}$ represents a hydrogen atom or a substituted or unsubstituted organic group. Since this structure has a relatively high polarity, there is then a desirable tendency to increase the strength of the cured product and its adhesion to substrates.

A plasticizer may also be used as component (C) in the present invention.

The addition of a plasticizer allows the adjustment of the viscosity and slump properties of the curable composition and the mechanical properties (e.g., hardness, tensile strength and elongation) of the cured product obtained by curing the curable composition. Specific examples of the plasticizer include phthalic acid ester compounds such as dibutyl phthalate, diisononyl phthalate (DINP), diheptyl phthalate, di(2-ethylhexyl) phthalate, diisodecyl phthalate (DIDP), and butyl benzyl phthalate; terephthalic acid ester compounds such as bis(2-ethylhexyl)-1,4-benzenedicarboxylate (specifically, product name: EASTMAN 168 (Eastman Chemical Company)); non-phthalic acid ester compounds such as diisononyl 1,2-cyclohexanedicarboxylate (specifically, product name: Hexamoll DINCH (BASF)); aliphatic polyvalent carboxylic acid ester compounds such as dioctyl adipate, dioctyl sebacate, dibutyl sebacate, diisodecyl succinate, and tributyl acetylcitrate; unsaturated fatty acid ester compounds such as butyl oleate and methyl acetylricinoleate; alkylsulfonic acid phenyl esters (specifically, product name: Mesamoll (LANXESS)); phosphoric acid ester compounds such as tricresyl phosphate and tributyl phosphate; trimellitic acid ester compounds; chlorinated paraffins; hydrocarbon oils such as alkylbiphenyls and partially hydrogenated terphenyls; process oils; and epoxy plasticizers such as epoxidized soybean oil and benzyl epoxystearate.

Also, polymer plasticizers may be used. When a polymer plasticizer is used, the initial physical properties can then be maintained for a long period of time compared with when a low molecular weight plasticizer is used which is a plasticizer containing no polymer moiety in the molecule. The drying properties (coating properties) of an alkyd coating material applied to the cured product can also be improved. Specific examples of the polymer plasticizers include, but not limited to, vinyl polymers obtained by polymerizing vinyl monomers by various methods; esters of polyalkylene glycols, such as diethylene glycol dibenzoate, triethylene glycol dibenzoate, and pentaerythritol esters; polyester plasticizers prepared from dibasic acids (e.g., sebacic acid, adipic acid, azelaic acid, phthalic acid) and divalent alcohols (e.g., ethylene glycol, diethylene glycol, triethylene glycol, propylene glycol, dipropylene glycol); polyethers such as polyether polyols (e.g., polyethylene glycol, polypropylene glycol, polytetramethylene glycol) which have a number average molecular weight of 500 or higher, or even a number average molecular weight of 1,000 or higher, and derivatives obtained by converting the hydroxy groups of these polyether polyols into ester groups, ether groups or other groups; polystyrenes such as polystyrene and poly-α-methylstyrene; polybutadiene, polybutene, polyisobutylene, polybutadiene-acrylonitrile, and polychloroprene.

Among these polymer plasticizers, those compatible with the reactive silyl group-containing organic polymer are preferred. In this respect, polyethers and vinyl polymers are preferred. Use of a polyether as the plasticizer is preferred because the surface curability and depth curability are then improved and curing retardation will not occur after storage. Especially, polypropylene glycol is more preferred. In terms of compatibility, weather resistance and heat resistance, vinyl polymers are preferred. Among vinyl polymers, acrylic polymers and/or methacrylic polymers are preferred, and acrylic polymers such as polyalkyl acrylates are more preferred. The polymers are preferably synthesized by living radical polymerization, more preferably atom transfer radical polymerization because these methods allow production of polymers having a narrow molecular weight distribution and low viscosity. Also preferred are polymers obtained by the continuous bulk polymerization of an alkyl acrylate monomer at high temperature and high pressure, that is, by the so-called SGO process, as described in JP-A 2001-207157.

The polymer plasticizer preferably has a number average molecular weight of 500 to 15,000, more preferably 800 to 10,000, still more preferably 1,000 to 8,000, particularly preferably 1,000 to 5,000, and most preferably 1,000 to 3,000. If the molecular weight is too low, the plasticizer exudes due to heat or rain over time so that the initial physical properties cannot be maintained for a long period of time. If the molecular weight is too high, the viscosity becomes high and the workability is impaired.

The molecular weight distribution of the polymer plasticizer is not particularly limited, and is preferably narrow. Specifically, the molecular weight distribution is preferably less than 1.80, more preferably 1.70 or less, still more preferably 1.60 or less, even more preferably 1.50 or less, particularly preferably 1.40 or less, and most preferably 1.30 or less.

The number average molecular weight of the polymer plasticizer is measured by the GPC method in the case that it is a vinyl polymer, and is measured by the terminal group analysis in the case that it is a polyether polymer. Also, the molecular weight distribution (Mw/Mn) is measured by the GPC method (relative to polystyrene standards).

The polymer plasticizer may or may not contain a reactive silyl group. When a reactive silyl group is present, the plasticizer then functions as a reactive plasticizer so that the transfer of the plasticizer from the cured product can be prevented. When the plasticizer contains a reactive silyl group, the number of reactive silyl groups is preferably not more than 1, and more preferably not more than 0.8, per molecule on average.

The amount of the plasticizer to be used for each 100 parts by weight in total of the reactive silyl group-containing organic polymer (A) and a reactive silyl group-containing organic polymer (B) is 0 to 40 parts by weight, preferably 0 to 30 parts by weight, and the plasticizer is even more preferably not incorporated. With more than 40 parts by weight, the problem of insufficient hardness may occur in the cured product. A single plasticizer may be used alone, or two or more plasticizers may be used in combination. Also, a combination of a low molecular weight plasticizer and a polymer plasticizer may be used. The plasticizer may be added at the time of polymer production.

In the present invention, in order to impart flexibility to the cured product, a reactive silyl group-containing organic polymer with a number average molecular weight of 8,000 to 50,000 may also be used as component (B).

There are no particular limitations on the backbone skeleton of the reactive silyl group-containing organic polymer (B) in the present invention. Various types of backbone skeletons can be used, and the same backbone skeletons as mentioned for the reactive silyl group-containing organic polymer (A) can generally be used.

The reactive silyl group-containing organic polymer (B) may be linear or branched and has a number average molecular weight determined relative to polystyrene standards by GPC of about 8,000 to 50,000, preferably 9,000 to 40,000, and particularly preferably 10,000 to 35,000. The number average molecular weight of less than 8,000 leads to undesirable trends in the elongation properties of the cured product, whereas the number average molecular weight of more than 50,000 tends to cause an elevated viscosity.

In the present invention, the number average molecular weight of the polymer present in the curable composition is determined for each peak in the GPC chart. A plurality of polymer species can be obtained by a single polymerization operation when a plurality of initiator species are used, and in such a case the number average molecular weight is not calculated as a whole but is determined for each polymer, that is, for each peak.

The same reactive silyl groups as mentioned for the reactive silyl group-containing organic polymer (A) can be used for the reactive silyl group in the reactive silyl group-containing organic polymer (B).

In order to obtain a rubbery cured product with high hardness, the organic polymer should contain on average at least one, preferably 1.3 to 5, and more preferably 1.3 to 3 reactive silyl groups per molecule of the polymer. When the number of reactive silyl groups per molecule on average is less than 1, the curability is insufficient and a low hardness cured product will be formed. The reactive silyl group may reside at a terminal of the molecular chain backbone of the organic polymer or may reside at a terminal of a side chain or may reside at both positions. In particular, when the reactive silyl group only resides at a terminal of the molecular chain backbone, the finally formed cured product has an increased effective network size of the organic polymer component, which means that a rubbery cured product having high strength and high elongation can readily be obtained.

The number of reactive silyl groups is defined as a value given by determining the ratio of these groups to the molecular chain terminal groups by $^1$H-NMR and then taking into account the structure of the organic polymer (the degree of branching which depends on the polymerization initiator used).

The blending ratio of the reactive silyl group-containing organic polymer (B) is not particularly limited, and is preferably 1 to 1,000 parts by weight, more preferably 5 to 900 parts by weight, even more preferably 10 to 800 parts by weight, and particularly preferably 50 to 200 parts by weight, per 100 parts by weight of the reactive silyl group-containing organic polymer (A).

In the present invention, a curing catalyst is used as the silanol condensation catalyst for components (A) and (B). Specific examples of the curing catalyst include titanium compounds such as tetrabutyl titanate, tetrapropyl titanate, titanium tetrakis(acetylacetonate), bis(acetylacetonate)-diisopropoxytitanium, and diisopropoxytitanium bis(ethyl acetoacetate); tetravalent organotin compounds such as dimethyltin diacetate, dimethyltin bis(acetylacetonate), dibutyltin dilaurate, dibutyltin maleate, dibutyltin phthalate, dibutyltin dioctanoate, dibutyltin bis(2-ethylhexanoate), dibutyltin bis(methyl maleate), dibutyltin bis(ethyl maleate), dibutyltin bis(butyl maleate), dibutyltin bis(octyl maleate), dibutyltin bis(tridecyl maleate), dibutyltin bis(benzyl maleate), dibutyltin diacetate, dioctyltin bis(ethyl maleate), dioctyltin bis(octyl maleate), dibutyltin dimethoxide, dibutyltin bis(nonylphenoxide), dibutenyltin oxide, dibutyltin oxide, dibutyltin bis(acetylacetonate), dibutyltin bis(ethyl acetoacetate), reaction products of dibutyltin oxide and a silicate compound, reaction products of dibutyltin oxide and a phthalic acid ester, dioctyltin dilaurate, dioctyltin diacetate, and dioctyltin bis (acetylacetonate); organoaluminum compounds such as aluminum tris(acetylacetonate), aluminum tris(ethyl acetoacetate), and diisopropoxyaluminum ethyl acetoacetate; and zirconium compounds such as zirconium tetrakis(acetylacetonate). Carboxylic acids and/or metal salts of carboxylic acids can also be used as the curing catalyst. In addition, amidine compounds as described in WO 2008/078654 can also be used. Examples of the amidine compounds include, but not limited to, 1-(o-tolyl)biguanide, 1-phenylguanidine, 1,2-dimethyl-1,4,5,6-tetrahydropyrimidine, 1,5,7-triazabicyclo[4.4.0]dec-5-ene, and 7-methyl-1,5,7-triazabicyclo[4.4.0]dec-5-ene.

The amount of the condensation catalyst to be used for each 100 parts by weight in total of the reactive silyl group-containing organic polymers (A) and (B) is preferably about 0.01 to 20 parts by weight, and more preferably 0.1 to 10 parts by weight.

An aminosilane may be added into the curable composition of the present invention. An aminosilane is a compound that contains a reactive silyl group and an amino group within the molecule and is generally known as an adhesion promoter. The use of an aminosilane provides a significant improvement in adhesion under primed or unprimed conditions when used with a variety of adherends, i.e., inorganic substrates such as glass, aluminum, stainless steel, zinc, copper and mortar, and organic substrates such as vinyl chloride, acrylic, polyester, polyethylene, polypropylene and polycarbonate. Here, a particularly significant improvement in adhesion to a variety of adherends is obtained under unprimed conditions. In addition, this compound can function as other agents such as a physical-property modifier and a dispersion improver for inorganic filler.

Specific examples of the reactive silyl group in the aminosilane include the groups mentioned earlier, and for example, a methoxy group and an ethoxy group are preferred in terms of the hydrolysis rate. Preferably, at least 2, particularly preferably at least 3 hydrolyzable groups are present. Specific examples of the aminosilane include amino group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(2-(2-aminoethyl)aminoethyl)aminopropyltrimethoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, and N,N'-bis[3-(trimethoxysilyl)propyl]ethylenediamine, as well as ketimine-type silanes such as N-(1,3-dimethyl-butylidene)-3-(triethoxysilyl)-1-propaneamine.

Among the preceding, the following are preferred for securing good adhesion: γ-aminopropyltrimethoxysilane, γ-(2-aminoethyl)aminopropyltrimethoxysilane, and γ-(2-aminoethyl)aminopropylmethyldimethoxysilane. A single aminosilane may be used alone or two or more may be used in combination. The γ-(2-aminoethyl)aminopropyltrimethoxysilane has been reported to be more irritating than other aminosilanes, and the irritation can be reduced by combining γ-aminopropyltrimethoxysilane to make up for the reduced amount of the former aminosilane.

The amount of the aminosilane to be added for each 100 parts by weight in total of the organic polymers (A) and (B) is preferably about 1 to 20 parts by weight, and more preferably 2 to 10 parts by weight. If the amount of aminosilane is less than 1 part by weight, sufficient adhesion may not be obtained. Conversely, if the amount exceeds 20 parts by weight, the cured product may become brittle so that sufficient strength cannot be obtained, and the curing rate may also be slow.

Adhesion promoters other than aminosilanes can be used in the composition of the present invention.

Specific examples of the adhesion promoters other than aminosilanes include: epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane; isocyanate group-containing silanes such as γ-isocyanatopropyltrimethoxysilane, γ-isocyanatopropyltriethoxysilane, γ-isocyanatopropylmethyldiethoxysilane, γ-isocyanatopropylmethyldimethoxysilane, (isocyanatomethyl)trimethoxysilane, and (isocyanatomethyl)dimethoxymethylsilane; mercapto group-containing silanes such as γ-mercaptopropyltrimethoxysilane, γ-mercaptopropyltriethoxysilane, γ-mercaptopropylmethyldimethoxysilane, γ-mercaptopropylmethyldiethoxysilane, and mercaptomethyltriethoxysilane; carboxysilanes such as β-carboxyethyltriethoxysilane, β-carboxyethylphenylbis(2-methoxyethoxy)silane, and N-β-(carboxymethyl)aminoethyl-γ-aminopropyltrimethoxysilane; vinylically unsaturated group-containing silanes such as vinyltrimethoxysilane, vinyltriethoxysilane, γ-methacryloyloxypropylmethyldimethoxysilane, and γ-acryloyloxypropylmethyltriethoxysilane; halogen-containing silanes such as γ-chloropropyltrimethoxysilane; and isocyanurate silanes such as tris(trimethoxysilyl)isocyanurate. Condensates obtained by partial condensation of the preceding silanes may also be used. Moreover, derivatives obtained by modifying the preceding can be used as silane coupling agents, e.g., amino-modified silyl polymers, silylated amino polymers, unsaturated aminosilane complexes, phenylamino-long chain-alkylsilanes, aminosilylated silicones, and silylated polyesters. The silane coupling agent, when used in the present invention, is typically in the range of 0.1 to 20 parts by weight for each 100 parts by weight in total of the reactive silyl group-containing organic polymers (A) and (B). In particular, it is preferably used in the range of 0.5 to 10 parts by weight.

The effect of the silane coupling agent added into the curable composition of the present invention is to provide a significant improvement in adhesion under primed or unprimed conditions when used with a variety of adherends, i.e., inorganic substrates such as glass, aluminum, stainless steel, zinc, copper and mortar, and organic substrates such as vinyl chloride, acrylic, polyester, polyethylene, polypropylene and polycarbonate. Here, a particularly significant improvement in adhesion to a variety of adherends is obtained under unprimed conditions. Specific examples of those other than silane coupling agents include, but not limited to, epoxy resins, phenolic resins, sulfur, alkyl titanates, and aromatic polyisocyanates. Each of the adhesion promoters may be used alone or two or more may be used in admixture. The addition of such an adhesion promoter can improve the adhesion to an adherend.

Among the preceding, γ-glycidoxypropyltrimethoxysilane, γ-glycidoxypropyltriethoxysilane, and γ-glycidoxypropylmethyldimethoxysilane are preferred for securing good adhesion.

The amount of the adhesion promoter to be used for each 100 parts by weight in total of the reactive silyl group-containing organic polymers (A) and (B) is preferably about 0.01 to 20 parts by weight, more preferably about 0.1 to 10 parts by weight, and particularly preferably about 1 to 7 parts by weight. If the amount of the adhesion promoter is below this range, sufficient adhesion may not be obtained. Conversely, if the amount of the adhesion promoter is above this range, practical depth curability may not be obtained.

Adhesion promoters other than the adhesion promoters mentioned above include, but not limited to, epoxy resins, phenolic resins, sulfur, alkyl titanates, and aromatic polyisocyanates. Each of these adhesion promoters may be used alone or two or more may be used in admixture. However, since an epoxy resin may lower the catalytic activity, depending on the added amount, a small amount of the epoxy resin is preferably added into the curable composition of the present invention. The amount of the epoxy resin to be used for each 100 parts by weight in total of components (A) and (B) is preferably not more than 5 parts by weight, and more preferably not more than 0.5 parts by weight, and it is particularly preferable that substantially no epoxy resin be contained.

An antioxidant (age resister) may be used in the composition provided by the present invention. The use of an antioxidant can enhance the heat resistance of the cured product. Examples of the antioxidant include hindered phenol antioxidants, monophenol antioxidants, bisphenol antioxidants, and polyphenol antioxidants, and particularly preferred are hindered phenol antioxidants. Other examples include the following hindered amine light stabilizers: TINUVIN 622LD, TINUVIN 144, CHIMASSORB 944LD, and CHIMASSORB 119FL (all are products of Ciba Japan Ltd.); MARK LA-57, MARK LA-62, MARK LA-67, MARK LA-63, and MARK LA-68 (all are products of ADEKA CORPORATION); and SANOL LS-770, SANOL LS-765, SANOL LS-292, SANOL LS-2626, SANOL LS-1114, and SANOL LS-744 (all are products of Sankyo Lifetech Co., Ltd.). Other specific examples of the antioxidant include those described in JP-A H04-283259 and JP-A H09-194731. The amount of the antioxidant to be used for each 100 parts by weight in total of the reactive silyl group-containing organic polymers (A) and (B) is preferably in the range of 0.1 to 10 parts by weight, and more preferably 0.2 to 5 parts by weight.

A light stabilizer may be used in the composition provided by the present invention. The use of a light stabilizer can prevent photooxidative degradation of the cured product. Examples of the light stabilizer include benzotriazole compounds, hindered amine compounds, and benzoate compounds, and particularly preferred are hindered amine compounds. The amount of the light stabilizer to be used for each 100 parts by weight in total of the reactive silyl group-containing organic polymers (A) and (B) is preferably in the range of 0.1 to 10 parts by weight, and more preferably 0.2 to 5 parts by weight. Specific examples of the light stabilizer include those described in JP-A H09-194731.

When a photo-curable substance, in particular an unsaturated acrylic compound, is combined in the composition provided by the present invention, a tertiary amine-containing hindered amine light stabilizer is preferably used as the hindered amine light stabilizer in order to improve the storage stability of the composition, as described in JP-A H05-70531. Examples of the tertiary amine-containing hindered amine light stabilizer include light stabilizers such as TINUVIN 622LD, TINUVIN 144, and CHIMASSORB 119FL (all are products of Ciba Japan Ltd.); MARK LA-57, LA-62, LA-67, and LA-63 (all are products of ADEKA CORPORATION); and SANOL LS-765, LS-292, LS-2626, LS-1114 and LS-744 (all are products of Ciba Japan Ltd.).

An ultraviolet absorber may be used in the composition provided by the present invention. The use of an ultraviolet absorber makes it possible to increase the surface weather resistance of the cured product. Examples of the ultraviolet absorber include benzophenone compounds, benzotriazole compounds, salicylate compounds, substituted tolyl compounds, and metal chelate compounds, and particularly preferred are benzotriazole compounds. The amount of the ultraviolet absorber to be used for each 100 parts by weight in total of the reactive silyl group-containing organic polymers (A) and (B) is preferably in the range of 0.1 to 10 parts by weight, and more preferably 0.2 to 5 parts by weight. A combination of a phenol or hindered phenol antioxidant, a hindered amine light stabilizer, and a benzotriazole ultraviolet absorber is preferably used.

A filler may be added into the composition of the present invention. Examples of the filler include reinforcing fillers such as fumed silica, precipitated silica, crystalline silica, fused silica, dolomite, silicic anhydride, hydrous silicic acid, and carbon black; fillers such as heavy calcium carbonate, colloidal calcium carbonate, magnesium carbonate, diatomite, calcined clay, clay, talc, titanium oxide, bentonite, organobentonite, ferric oxide, fine aluminum powder, flint powder, zinc oxide, activated zinc white, shirasu balloons, glass microballoons, organic microballoons of a phenolic resin or a vinylidene chloride resin, and resin powders such as PVC powder and PMMA powder; and fibrous fillers such as glass fiber and filaments. When a filler is used, the amount to be used for each 100 parts by weight in total of the polymers (A) and (B) is 1 to 1,000 parts by weight, preferably 10 to 700 parts by weight, and more preferably 50 to 500 parts by weight.

In the case that such a filler is used in order to obtain a high strength cured product, the filler is preferably selected mainly from, for example, fumed silica, precipitated silica, crystalline silica, fused silica, dolomite, silicic anhydride, hydrous silicic acid, carbon black, surface-treated finely divided calcium carbonate, calcined clay, clay, and activated zinc white, and in this case favorable results can be obtained when it is used in the range of 1 to 250 parts by weight, preferably 10 to 200 parts by weight, for each 100 parts by weight in total of the reactive silyl group-containing organic polymers (A) and (B). In the case that the filler is used in order to obtain a cured product having low strength and great elongation at break, favorable results can be obtained when the filler is selected mainly from, for example, titanium oxide, calcium carbonates such as heavy calcium carbonate, magnesium carbonate, talc, ferric oxide, zinc oxide, and shirasu balloons, and the selected filler is used in the range of 5 to 1,000 parts by weight, preferably 20 to 700 parts by weight, for each 100 parts by weight in total of the reactive silyl group-containing organic polymers (A) and (B). In general, calcium carbonate with a greater specific surface area has a larger effect in improving the tensile strength at break, the elongation at break, and the adhesiveness of the cured product. Of course, each of these fillers may be used alone or two or more may be used in admixture. When calcium carbonate is used, it is desirable to combine surface-treated finely divided calcium carbonate with a calcium carbonate having a large particle size such as heavy calcium carbonate. The surface-treated finely divided calcium carbonate preferably has a particle size of not more than 0.5 μm, and is preferably surface-treated with a fatty acid or a fatty acid salt. The large particle size calcium carbonate preferably has a particle size of at least 1 and may not be surface-treated.

It is preferable to add organic balloons or inorganic balloons in order to improve the workability (e.g. coating workability) of the composition and to provide a matte surface to the cured product. The surfaces of these fillers may be treated. A single species of these fillers may be used alone, or two or more species may be used in admixture. In order to improve the workability (e.g. coating workability), the particle size of balloons is preferably 0.1 mm or smaller. In order to provide a matte surface to the cured product, the particle size is preferably 5 to 300 μm.

Balloons are spherical filler having a hollow inside. Examples of the material of the balloons include, but not limited to, inorganic materials such as glass, shirasu and silica, and organic materials such as phenolic resin, urea resin, polystyrene and Saran. An inorganic material and an organic material may be formed into a composite or may be layered to form a multilayer. Inorganic, organic, or their composite balloons may be used. Also, a single type of balloons may be used, or a mixture of multiple types of balloons made of different materials may be used. Moreover, the surface of balloons to be used may be processed or coated, or may be treated with various surface treating agents. For example, organic balloons may be coated with calcium carbonate, talc, titanium oxide, or the like, or inorganic balloons may be surface-treated with an adhesion promoter.

Specific examples of the balloons include those described in JP-A H02-129262, JP-A H04-8788, JP-A H04-173867, JP-A H05-1225, JP-A H07-113073, JP-A H09-53063, JP-A H10-251618, JP-A 2000-154368, JP-A 2001-164237, and WO 97/05201.

A silicate may also be used in the composition of the present invention. This silicate serves as a crosslinking agent and functions to improve the recovery, the durability and the creep resistance of the organic polymer (A) in the present invention. In addition, the silicate also has the effects of improving the adhesion and water-resistant adhesion, and the durability of adhesion at high temperatures and high humidities. The silicate may be a tetraalkoxysilane or its partially hydrolyzed condensate. When a silicate is used, the amount to be used for each 100 parts by weight in total of the organic polymers (A) and (B) is 0.1 to 20 parts by weight, preferably 0.5 to 10 parts by weight.

Specific examples of the silicate include tetraalkoxysilanes (tetraalkyl silicates) such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxysilane, tetra-i-butoxysilane, and tetra-t-butoxysilane, and partially hydrolyzed condensates thereof.

Partially hydrolyzed condensates of tetraalkoxysilanes are more preferred because they have a greater effect in improving the recovery, the durability and the creep resistance in the present invention than tetraalkoxysilanes do.

Examples of the partially hydrolyzed condensates of tetraalkoxysilanes include those obtained by an ordinary method in which water is added to a tetraalkoxysilane and then partial hydrolysis and condensation are carried out. The partially hydrolyzed condensate of an organosilicate compound may be a commercially available product. Specific examples of such a condensate include Methyl Silicate 51 and Ethyl Silicate 40 (both from COLCOAT CO., LTD.).

A tackifier may be added into the composition of the present invention. Examples of the tackifying resin include, but not limited to, generally used tackifying resins including those which are solid or liquid at ordinary temperature. Specific examples include styrene block copolymers and their hydrogenates, phenol resins, modified phenol resins (e.g., cashew oil-modified phenol resins, tall oil-modified phenol resins), terpene phenol resins, xylene phenol resins, cyclopentadiene phenol resins, cumarone indene resins, rosin resins, rosin ester resins, hydrogenated rosin ester resins, xylene resins, low molecular weight polystyrene resins, styrene copolymer resins, petroleum resins (e.g., C5 hydrocarbon resins, C9 hydrocarbon resins, C5/C9 hydrocarbon copolymer resins), hydrogenated petroleum resins, terpene resins, and DCPD petroleum resins. Each of these may be used alone or two or more of these may be used in combination. Examples of the styrene block copolymers and their hydrogenates include styrene-butadiene-styrene block copolymers (SBS), styrene-isoprene-styrene block copolymers (SIS), styrene-ethylene-butylene-styrene block copolymers (SEBS), styrene-ethylene-propylene-styrene block copolymers (SEPS), and styrene-isobutylene-styrene block copolymers (SIBS). Each of the tackifying resins may be used alone or two or more may be used in combination.

The tackifying resin is used in the range of 5 to 1,000 parts by weight, preferably 10 to 100 parts by weight, for each 100 parts by weight in total of components (A) and (B).

The curable composition of the present invention may optionally incorporate a physical-property modifier to modify the tensile properties of the cured product to be formed. Examples of the physical-property modifier include, but not limited to, alkylalkoxysilanes such as methyltrimethoxysilane, dimethyldimethoxysilane, trimethylmethoxysilane, and n-propyltrimethoxysilane; alkylisopropenoxysilanes such as dimethyldiisopropenoxysilane, methyltriisopropenoxysilane and γ-glycidoxypropylmethyldiisopropenoxysilane, and functional group-containing alkoxysilanes such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane, and γ-mercaptopropylmethyldimethoxysilane; silicone varnishes; and polysiloxanes. The use of such a physical-property modifier makes it possible to increase the hardness when the composition of the present invention is cured, or conversely to reduce the hardness to enhance elongation at break. Each of the physical-property modifiers may be used alone or two or more may be used in combination.

In particular, a compound that generates a compound containing a monovalent silanol group within the molecule by hydrolysis serves to decrease the modulus of the cured product without deteriorating the stickiness on the surface of the cured product. Particularly preferred are compounds generating trimethylsilanol. Examples of the compound that generates a compound containing a monovalent silanol group within the molecule by hydrolysis include compounds as disclosed in JP-A H05-117521. Other examples include compounds generating silicon compounds that are derivatives of alkyl alcohols such as hexanol, octanol and decanol, and generate $R_3SiOH$ such as trimethylsilanol by hydrolysis; and compounds generating silicon compounds that are derivatives of polyhydric alcohols each having three or more hydroxy groups such as trimethylolpropane, glycerol, pentaerythritol and sorbitol, and generate $R_3SiOH$ such as trimethylsilanol by hydrolysis, as disclosed in JP-A H11-241029.

Still other examples include compounds generating silicon compounds that are derivatives of oxypropylene polymers and generate $R_3SiOH$ such as trimethylsilanol by hydrolysis, as disclosed in JP-A H07-258534; and polymers containing a cross-linkable, reactaive silyl group and a silyl group that can form a monosilanol-containing compound by hydrolysis, as disclosed in JP-A H06-279693.

The physical-property modifier is used in the range of 0.1 to 20 parts by weight, preferably 0.5 to 10 parts by weight, for each 100 parts by weight in total of the reactive silyl group-containing organic polymers (A) and (B).

The curable composition of the present invention may optionally incorporate a thixotropic agent (anti-sagging agent) to prevent sagging and improve workability. Examples of the anti-sagging agent include, but not limited to, polyamide waxes, hydrogenated castor oil derivatives, and metal soaps such as calcium stearate, aluminum stearate, and barium stearate. Use of powdery rubber having a particle size of 10 to 500 μm as disclosed in JP-A H11-349916 or organic fibers as disclosed in JP-A 2003-155389 enables to obtain a composition that is highly thixotropic and has good workability. Each of the thixotropic agents (anti-sagging agents) may be used alone, or two or more may be used in combination. The thixotropic agent is used in the range of 0.1 to 20 parts by weight for each 100 parts by weight in total of components (A) and (B).

The composition of the present invention may contain a compound containing an epoxy group within the molecule. Such an epoxy group-containing compound can enhance the recovery of the cured product. Examples of the epoxy group-containing compound include epoxidized unsaturated fats and oils, epoxidized unsaturated fatty acid esters, alicyclic epoxy compounds, epichlorohydrin derivatives and other compounds, and mixtures thereof. Specific examples thereof include epoxidized soybean oil, epoxidized linseed oil, bis(2-ethylhexyl)-4,5-epoxycyclohexane-1,2-dicarboxylate (E-PS), epoxy octyl stearate, and epoxy butyl stearate. Among these, E-PS is particularly preferred. The epoxy compound is preferably used in the range of 0.5 to 50 parts by weight for each 100 parts by weight in total of the reactive silyl group-containing organic polymers (A) and (B).

The composition of the present invention may contain a photo-curable substance. The use of a photo-curable substance results in the formation of a layer of the photo-curable substance on the surface of the cured product, thereby improving the properties of the cured product in terms of stickiness and weather resistance. The photo-curable substance is a substance that undergoes chemical changes in the molecular structure in a considerably short period of time by action of light so that changes in the physical properties such as curing can be caused. Such substances include many known compounds such as organic monomers, oligomers, resins, and compositions containing any of them, and any commercially available ones can be used. Typical examples include unsaturated acrylic compounds, polyvinyl cinnamates, and azidized resins. Examples of the unsaturated acrylic compounds include monomers containing a single or multiple acrylic or methacrylic unsaturated groups, and oligomers thereof, and mixtures thereof; specifically, monomers such as propylene (or butylene or ethylene) glycol di(meth)acrylate, and neopentyl glycol di(meth)acrylate, and oligoesters thereof with a molecular weight of 10,000 or lower. More specific examples thereof include the special acrylates: (difunctional) Aronix M-210, Aronix M-215, Aronix M-220, Aronix M-233, Aronix M-240 and Aronix M-245; (trifunctional) Aronix M-305, Aronix M-309, Aronix M-310, Aronix M-315, Aronix M-320 and Aronix M-325; and (polyfunctional) Aronix M-400. In particular, acrylic functional group-containing compounds are preferred, and compounds containing on average 3 or more acrylic functional groups per molecule are also preferred (all Aronix products available from Toagosei Co., Ltd.).

Examples of the polyvinyl cinnamates include photosensitive resins containing cinnamoyl groups as photosensitive groups; specifically, ones resulting from esterification of polyvinyl alcohol with cinnamic acid, as well as many derivatives of polyvinyl cinnamate. The azidized resins are known as photosensitive resins with azide groups functioning as photosensitive groups, and include photosensitive rubber solutions typically containing a diazide compound as a photosensitizer. Detailed examples of the resins are also described in "Kankosei Jushi (Photosensitive Resins)" (published on Mar. 17, 1972 by Insatsu Gakkai Shuppanbu Ltd., p. 93 ff., p. 106 ff., and p. 117 ff.). Each of the resins may be used alone or two or more may be used in admixture, optionally along with a sensitizer. In some cases, addition of a sensitizer (e.g. ketones, nitro compounds) or an accelerator (e.g. amines) enhances the effect. The photo-curable substance is preferably used in the range of 0.1 to 20 parts by weight, and more preferably 0.5 to 10 parts by weight, for each 100 parts by weight in total of the reactive silyl group-containing organic polymers (A) and (B). The amount of less than 0.1 parts by weight is unlikely to provide the effect of enhancing weather resistance, whereas the amount of more than 20 parts by weight is likely to lead to too hard a cured product which tends to undergo cracking.

The composition of the present invention may contain an oxygen-curable substance. Examples of the oxygen-curable substance include unsaturated compounds that can react with oxygen in the air, and these compounds serve, for example, to prevent surface stickiness and adhesion of dirt or dust to the surface of the cured product by reacting with oxygen in the air to form a cured layer around the surface of the cured product. Specific examples of the oxygen-curable substance include drying oils such as tung oil and linseed oil, and various alkyd resins obtained by modification of such compounds; drying oil-modified acrylic polymers, epoxy resins, and silicone resins; liquid polymers such as 1,2-polybutadiene, 1,4-polybutadiene and polymers of C5-C8 dienes, which are obtainable by polymerizing or copolymerizing diene compounds such as butadiene, chloroprene, isoprene and 1,3-pentadiene, liquid copolymers such as NBR and SBR, which are obtainable by copolymerizing the diene compound and a monomer copolymerizable therewith (e.g. acrylonitrile, styrene) such that the diene compound serves as the main component, and various modified products thereof (e.g. maleate-modified products, boiled-oil-modified products). Each of these may be used alone, or two or more of these may be used in combination. Among these, tung oil and liquid diene polymers are particularly preferred. The combined use with a catalyst or metal dryer for promoting the oxidative curing reaction can enhance the effect in some cases. Examples of the catalyst and metal dryer include metal salts such as cobalt naphthenate, lead naphthenate, zirconium naphthenate, cobalt octylate, and zirconium octylate, and amine compounds. The amount of the oxygen-curable substance to be used is preferably in the range of 0.1 to 20 parts by weight, and more preferably 0.5 to 10 parts by weight, for each 100 parts by weight in total of the reactive silyl group-containing organic polymers (A) and (B). The amount of less than 0.1 parts by weight is likely to result in insufficient improvement of stain resistance, whereas the amount of more than 20 parts by weight tends to deteriorate the tensile properties of the cured product and the like. As described in JP-A H03-160053, the oxygen-curable substance is preferably used in combination with a photo-curable substance.

The curable composition of the present invention may incorporate a flame retardant such as phosphorus-based plasticizers such as ammonium polyphosphate and tricresyl phosphate, aluminum hydroxide, magnesium hydroxide, and thermoexpandable graphite. Each of these flame retardants may be used alone, or two or more of these may be used in combination.

The flame retardant is used in the range of 5 to 200 parts by weight, preferably 10 to 100 parts by weight, for each 100 parts by weight in total of components (A) and (B).

The curable composition of the present invention may optionally incorporate various additives in order to adjust physical properties of the curable composition or a cured product thereof. Examples of the additives include curability modifiers, radical inhibitors, metal deactivators, antiozonants, phosphorus-containing peroxide decomposers, lubricants, pigments, blowing agents, repellents for ants, and antifungal agents. Each of these various additives may be used alone, or two or more of these may be used in combination. Specific examples of the additives other than the ones specifically mentioned herein are described in, for example, JP-B H04-69659, JP-B H07-108928, JP-A S63-254149, JP-A S64-22904, and JP-A 2001-72854.

The curable composition of the present invention can be prepared as a one-pack formulation which is prepared by mixing all the formulation components and storing the mixture in a hermetically closed vessel in advance, and after application, is curable by moisture in the air. Also, the curable composition can be prepared as a two-pack formulation in which a mixture of components including a curing catalyst, filler, plasticizer and water is separately prepared as a curing agent, and then the mixture and a polymer composition are mixed just before use. In terms of workability, a one-pack formulation is preferred.

In the case where the curable composition is prepared as a one-pack formulation, since all the formulation components are mixed in advance, it is preferable that the water-containing formulation components be dehydrated and dried prior to use, or be dehydrated by, for example, the application of reduced pressure during mixing and kneading. In the case where the curable composition is prepared as a two-pack formulation, since the curing catalyst needs not be mixed in the base mixture that contains the reactive silyl group-containing organic polymer, gelation is less likely even when a small amount of water remains in the mixture. However, dehydration and drying are preferably performed when long-term storage stability is required. The method for dehydration and drying is suitably, in the case of a solid such as powder, thermal drying or dehydration under reduced pressure, and, in the case of a liquid, dehydration under reduced pressure or dehydration using, for example, synthetic zeolite, active alumina, silica gel, quick lime, or magnesium oxide. In addition to these methods for dehydration and drying, a method may also be used which involves dehydration by carrying out the reaction of water with an added alkoxysilane compound such as n-propyltrimethoxysilane, vinyltrimethoxysilane, vinylmethyldimethoxysilane, methyl silicate, ethyl silicate, γ-mercaptopropylmethyldimethoxysilane, γ-mercaptopropylmethyldiethoxysilane, and γ-glycidoxypropyltrimethoxysilane. Dehydration may also be performed by reacting water with an added oxazolidine compound such as 3-ethyl-2-methyl-2-(3-methylbutyl)-1,3-oxazolidine. Dehydration may also be performed by adding a small amount of an isocyanate compound and then reacting water with the isocyanate group. The storage stability can be improved by adding an alkoxysilane compound, oxazolidine compound, or isocyanate compound.

The amount of the dehydrating agent, particularly a silicon compound reactive with water (e.g. vinyltrimethoxysilane), to be used is preferably in the range of 0.1 to 20 parts by weight, and more preferably 0.5 to 10 parts by weight, for each 100 parts by weight in total of the reactive silyl group-containing organic polymers (A) and (B).

The curable composition of the present invention may be prepared by any methods including commonly used methods such as a method in which the aforementioned components are mixed and kneaded at room temperature or under heating by a mixer, roller, kneader or the like; and a method in which the components are dissolved in a small amount of an appropriate solvent and then mixed.

When exposed to the air, the curable composition of the present invention forms a three-dimensional network structure by the action of moisture, so as to be cured into a rubbery, elastic solid.

The curable composition of the present invention can be used in applications such as adhesives, flooring adhesives, tile adhesives, coating agents, pressure-sensitive adhesives, impression materials, vibration-proof materials, damping materials, soundproof materials, expanded/foamed materials, paints, and spray coatings. The cured product obtained by curing the curable composition of the present invention is more preferably applied to wood flooring adhesives and tile adhesives, which require high hardness in particular. The hardness of the cured product determined with a type A durometer is preferably at least 60, and more preferably at least 65. The use of the composition of the present invention for bonding to, for example, tiles, glass, decorative sheets or wood is preferred because the tiles and so forth are then resistant to cracking. In addition, the composition of the present invention is suitable for crack repair materials for concrete.

The curable composition of the present invention can also be used in various applications such as electric and electronic part materials (e.g. solar cell backside sealants); electrical insulating materials (e.g. insulating coating materials for electric wires and cables); elastic adhesives; contact adhesives; spray sealants; crack repair materials; tile adhesives; powder coating compositions; casting materials; rubber materials for medical use; pressure-sensitive adhesives for medical use; sealing materials for medical devices; food packaging materials; joint sealing materials for siding boards and other exterior materials; primers; electromagnetic-wave-shielding conductive materials; thermally conductive materials; hot melt materials; potting agents for electrics and electronics; films; gaskets; various molding materials; rustproof and waterproof encapsulants for wired glass and laminated glass edges (cut end faces); and liquid sealants for use in automotive parts, electrical machinery parts, various machinery parts and the like. Further, the curable composition can also be used as various sealing compositions and adhesive compositions because it, either alone or with the aid of a primer, can adhere to a wide range of substrates such as glass, ceramics, wood, metals, and resin moldings. In addition, the curable composition of the present invention can also be used for adhesives for interior panels, adhesives for exterior panels, stone pitching adhesives, ceiling finishing adhesives, floor finishing adhesives, wall finishing adhesives, vehicle panel adhesives, and adhesives for electric/electronic/precision device assembling.

EXAMPLES

The present invention is described in greater detail, referring to the following specific examples, but the present invention is not limited to the examples.

Synthesis Example 1

First, 1.2 equivalents of NaOMe in methanol was added per hydroxy group of a polypropylene glycol having a number average molecular weight of approximately 4,800 (polystyrene equivalent molecular weight measured using a TOSOH model HLC-8120 GPC solvent delivery system, a TOSOH model TSK-GEL H type column, and THF as the solvent), the methanol was distilled off, and 3-chloro-1-propene was then added to convert the terminal hydroxy group to an allyl group. Then 36 ppm of a platinum-divinyldisiloxane complex (isopropanol solution with a concentration of 3% by weight calculated as platinum) was added to 100 parts by weight of the obtained allyl group-terminated polyoxypropylene and, while stirring, 5.99 parts by weight of dimethoxymethylsilane was slowly added dropwise. This mixed solution was reacted for 2 hours at 90° C. and then the unreacted dimethoxymethylsilane was removed under reduced pressure to give a dimethoxymethylsilyl group-terminated, reactive silyl group-containing linear polyoxypropylene polymer (A-1) with 1.5 silyl groups per molecule on average and a number average molecular weight of 4,800.

Synthesis Example 2

First, 1.2 equivalents of NaOMe in methanol was added to 100 parts by weight of a polyoxypropylene triol having a number average molecular weight of approximately 4,100 (calculated by the same method as in Synthesis Example 1), the methanol was distilled off, and 3-chloro-1-propene was then added to convert the terminal hydroxy group to an allyl group. Then 36 ppm of a platinum-divinyldisiloxane complex (isopropanol solution with a concentration of 3% by weight calculated as platinum) was added to 100 parts by weight of the obtained allyl group-terminated polyoxypropylene and, while stirring, 8.14 parts by weight of dimethoxymethylsilane was slowly added dropwise. This mixed solution was reacted for 2 hours at 90° C. and then the unreacted dimethoxymethylsilane was removed under reduced pressure to give a dimethoxymethylsilyl group-terminated, reactive silyl group-containing branched polyoxypropylene polymer (A-2) with 2.2 silyl groups per molecule on overage and a number average molecular weight of 4,100.

Synthesis Example 3

First, 30 ppm of dibutyltin dilaurate was added to 100 parts by weight of a polyoxypropylene triol having a number average molecular weight of approximately 4,100 (calculated by the same method as in Synthesis Example 1) and, while stirring, 19.3 parts by weight of 3-isocyanatopropyltrimethoxysilane was slowly added dropwise. This mixed solution was reacted for 3 hours at 90° C. followed by deaeration for 2 hours to give a trimethoxysilyl group-terminated, reactive silyl group-containing branched polyoxypropylene polymer (A-3) with 2.8 silyl groups per molecule on average and a number average molecular weight of 4,100.

Synthesis Example 4

First, 1.2 equivalents of NaOMe in methanol was added per hydroxy group of a polypropylene glycol having a number average molecular weight of approximately 4,100 (calculated by the same method as in Synthesis Example 1), the methanol was distilled off, and 3-chloro-1-propene was then added to convert the terminal hydroxy group to an allyl group. Then 36 ppm of a platinum-divinyldisiloxane complex (isopropanol solution with a concentration of 3% by weight calculated as platinum) was added to 100 parts by weight of the obtained allyl group-terminated polyoxypropylene and, while stirring, 3.80 parts by weight of dimethoxymethylsilane was slowly added dropwise. This mixed solution was reacted for 2 hours at 90° C. and then the unreacted dimethoxymethylsilane was removed under reduced pressure to give a dimethoxymethylsilyl group-terminated, reactive silyl group-containing linear polyoxypropylene polymer (B-1) with 1.0 silyl group per molecule on average and a number average molecular weight of 4,100.

Synthesis Example 5

Propylene oxide was polymerized using a polyoxypropylene diol having a number average molecular weight of approximately 3,000 as the initiator in the presence of a zinc hexacyanocobaltate glyme complex catalyst to give a polyoxypropylene glycol having a number average molecular weight of 14,600 (calculated by the same method as in Synthesis Example 1). Then 1.2 equivalents of NaOMe in methanol was added per hydroxy group of the hydroxy group-terminated polyoxypropylene diol, the methanol was distilled off, and 3-chloro-1-propene was then added to convert the terminal hydroxy group to an allyl group. Then 36 ppm of a platinum-divinyldisiloxane complex (isopropanol solution with a concentration of 3% by weight calculated as platinum) was added to 100 parts by weight of the obtained allyl group-terminated polyoxypropylene and, while stirring, 1.77 parts by weight of dimethoxymethylsilane was slowly added dropwise. This mixed solution was reacted for 2 hours at 90° C. and then the unreacted dimethoxymethylsilane was removed under reduced pressure to give a dimethoxymethylsilyl group-terminated, reactive silyl group-containing linear polyoxypropylene polymer (B-2) with 1.5 silyl groups per molecule on average and a number average molecular weight of 14,600.

Synthesis Example 6

Propylene oxide was polymerized using a polyoxypropylene triol having a number average molecular weight of approximately 3,000 as the initiator in the presence of a zinc hexacyanocobaltate glyme complex catalyst to give a polyoxypropylene triol having a number average molecular weight of 26,200 (calculated by the same method as in Synthesis Example 1). Then 1.2 equivalents of NaOMe in methanol was added per hydroxy group of the hydroxy group-terminated polyoxypropylene triol, the methanol was distilled off, and 3-chloro-1-propene was then added to convert the terminal hydroxy group to an allyl group. Then 36 ppm of a platinum-divinyldisiloxane complex (isopropanol solution with a concentration of 3% by weight calculated as platinum) was added to 100 parts by weight of the obtained allyl group-terminated polyoxypropylene and, while stirring, 1.28 parts by weight of dimethoxymethylsilane was slowly added dropwise. This mixed solution was reacted for 2 hours at 90° C. and then the unreacted dimethoxymethylsilane was removed under reduced pressure to give a dimethoxymethylsilyl group-terminated, reactive silyl group-containing polyoxypropylene polymer (B-3) with 2.2 silyl groups per molecule on average and a number average molecular weight of 26,200.

Synthesis Example 7

Propylene oxide was polymerized using a polyoxypropylene triol having a number average molecular weight of approximately 3,000 as the initiator in the presence of a zinc hexacyanocobaltate glyme complex catalyst to give a polyoxypropylene triol having a number average molecular weight of 16,400 (calculated by the same method as in Synthesis Example 1). Then 1.2 equivalents of NaOMe in methanol was added per hydroxy group of the hydroxy group-terminated polyoxypropylene triol, the methanol was distilled off, and 3-chloro-1-propene was then added to convert the terminal hydroxy group to an allyl group. Then 36 ppm of a platinum-divinyldisiloxane complex (isopropanol solution with a concentration of 3% by weight calculated as platinum) was added to 100 parts by weight of the obtained allyl group-terminated polyoxypropylene and, while stirring, 1.78 parts by weight of dimethoxymethylsilane was slowly added dropwise. This mixed solution was reacted for 2 hours at 90° C. and then the unreacted dimethoxymethylsilane was removed under reduced pressure to give a dimethoxymethylsilyl group-terminated, reactive silyl group-containing polyoxypropylene polymer (B-4) with 2.2 silyl groups per molecule on average and a number average molecular weight of 16,400.

Example 1

An amount of 100 parts by weight of the polymer (A-1) was mixed and thoroughly kneaded with the following: 120 parts by weight of fatty acid-treated calcium carbonate (Shiraishi Kogyo Kaisha, Ltd., product name: Hakuenka CCR), 20 parts by weight of a pigment (Ishihara Sangyo Kaisha Ltd., product name: TIPAQUE R820), and 2 parts by weight of a thixotropic agent (Kusumoto Chemicals, Ltd., product name: DISPARLON 6500). This was followed by dispersion by a single passage through a three-roll paint mill to prepare a composition.

(Evaluation)

The viscosity ratio, hardness, and glass plate cracking strength were determined on the obtained composition using the following methods.

(Viscosity Ratio)

In an atmosphere of 23° C. and 50% relative humidity, the viscosity was measured with a BS-type viscometer using a No. 7 rotor (Toki Sangyo Co., Ltd.) at 2 rpm and 10 rpm in order to determine the viscosity ratio between that at 2 rpm and that at 10 rpm, which is indicative of thixotropy. The results are given in Tables 1 and 2.

(Hardness)

In an atmosphere of 23° C. and 50% relative humidity, to the composition were added 2 parts by weight of vinyltrimethoxysilane (Momentive Performance Materials Inc., product name: A-171), 3 parts by weight of N-(2-aminoethyl)-3-aminopropyltrimethoxysilane (Momentive Performance Materials Inc., product name: A-1122) and 2 parts by weight of dibutyltin bis(acetylacetonate) (Nitto Kasei Co., Ltd.) as condensation catalyst each relative to 100 parts by weight of the polymer (A-1), and they were thoroughly mixed. Using a spatula, the mixture was filled into a mold having a thickness of about 8 mm, and the surface was made flat. After 3 days, the hardness of the resulting cured product was measured using a type A durometer according to JIS K 6253. The results are given in Tables 1 and 2.

(Test for Glass Plate Cracking Strength)

In an atmosphere of 23° C. and 50% relative humidity, to the composition were added 2 parts by weight of vinyltrimethoxysilane (Momentive Performance Materials Inc., product name: A-171), 3 parts by weight of N-(2-aminoethyl)-3-aminopropyltrimethoxysilane (Momentive Performance Materials Inc., product name: A-1122), and 2 parts by weight of dibutyltin bis(acetylacetonate) (Nitto Kasei Co., Ltd.) as condensation catalyst each relative to 100 parts by weight of the polymer (A-1), and they were thoroughly mixed.

Using a notched trowel, the prepared composition was applied and combed onto a 70 mm×150 mm×4 mm slate plate, and a 70 mm×150 mm×1.8 mm glass plate (T. P Giken, float glass plate) was then laminated thereon (this assembly is referred to below as the test specimen). The composition was cured for 3 days at 23° C. and 50% relative humidity and then for 4 days at 50° C. to effect curing. Using a bending tester as described in JIS K 7171 (fulcrum distance: 10 mm, indenter radius: 5 mm), bending testing was performed on the test specimen and the force required to crack the glass plate was measured. The results are given in Tables 1 and 2.

Examples 2 to 5 and Comparative Examples 1 to 6

Compositions were obtained by following the same procedure as in Example 1 but using the components in the proportions given in Tables 1 and 2, and the evaluations were then performed.

TABLE 1

| Composition (parts by weight) | | Example 1 | Example 2 | Example 3 | Example 4 | Example 5 |
|---|---|---|---|---|---|---|
| Polymer (A) | A-1 | 100 | 100 | | | |
| | A-2 | | | 100 | 100 | |
| | A-3 | | | | | 100 |
| Plasticizer (C) | DIDP[1] | | 20 | | 20 | |
| Filler | Hakuenka CCR[2] | 120 | 120 | 120 | 120 | 120 |
| Pigment | TIPAQUE R820[3] | 20 | 20 | 20 | 20 | 20 |
| Thixotropic agent | DISPARLON #6500[4] | 2 | 2 | 2 | 2 | 2 |
| Dehydrating agent | A-171[5] | 2 | 2 | 2 | 2 | 2 |
| Adhesion promoter | A-1122[6] | 3 | 3 | 3 | 3 | 3 |
| Condensation catalyst | U-220H[7] | 2 | 2 | 2 | 2 | |
| | U-100[8] | | | | | 0.2 |
| Viscosity ratio | | 4.2 | 4.0 | 4.2 | 4.1 | 4.2 |
| Shore A hardness | After 3 days | 65 | 60 | 75 | 70 | 90 |
| Glass plate cracking strength (N) | | 2500 | Not performed | 2600 | Not performed | 2850 |

[1]Isodecyl phthalate (J-PLUS Co., Ltd.)
[2]Fatty acid-treated precipitated calcium carbonate (Shiraishi Kogyo Kaisha, Ltd.)
[3]Titanium oxide (Ishihara Sangyo Kaisha Ltd.)
[4]Fatty acid amide wax (Kusumoto Chemicals, Ltd.)
[5]Vinyltrimethoxysilane (Momentive Performance Materials Inc.)
[6]N-(2-aminoethyl)-3-aminopropyltrimethoxysilane (Momentive Performance Materials Inc.)
[7]Dibutyltin bis(acetylacetonate) (Nitto Kasei Co., Ltd.)
[8]Dibutyltin dilaurate (Nitto Kasei Co., Ltd.)

TABLE 2

| Composition (parts by weight) | | Comparative Example 1 | Comparative Example 2 | Comparative Example 3 | Comparative Example 4 | Comparative Example 5 | Comparative Example 6 |
|---|---|---|---|---|---|---|---|
| Polymer (A) | A-1 | 70 | | | | | |
| | A-2 | | 70 | | | | |
| | A-3 | | | 70 | | | |
| Polymer (B) | B-1 | | | | 100 | | |
| | B-2 | | | | | 100 | |
| | B-3 | | | | | | 100 |
| Plasticizer (C) | DIDP[(1)] | 85 | 85 | 85 | | | 20 |
| Filler | Hakuenka CCR[(2)] | 120 | 120 | 120 | 120 | 120 | 120 |
| Pigment | TIPAQUE R820[(3)] | 20 | 20 | 20 | 20 | 20 | 20 |
| Thixotropic agent | DISPARLON #6500[(4)] | 2 | 2 | 2 | 2 | 2 | 2 |
| Dehydrating agent | A-171[(5)] | 2 | 2 | 2 | 2 | 2 | 2 |
| Adhesion promoter | A-1122[(6)] | 3 | 3 | 3 | 3 | 3 | 3 |
| Condensation catalyst | U-220H[(7)] | 2 | 2 | | 2 | 2 | 2 |
| | U-100[(8)] | | | 0.2 | | | |
| Viscosity ratio | | 4.1 | 4.1 | 4.1 | 4.2 | 3.8 | 3.5 |
| Shore A hardness | After 3 days | 35 | 55 | 58 | 20 | 45 | 45 |
| Glass plate cracking strength (N) | | Not performed | Not performed | Not performed | 1500 | 1700 | 1800 |

[(1)]Isodecyl phthalate (J-PLUS Co., Ltd.)
[(2)]Fatty acid-treated precipitated calcium carbonate (Shiraishi Kogyo Kaisha, Ltd.)
[(3)]Titanium oxide (Ishihara Sangyo Kaisha Ltd.)
[(4)]Fatty acid amide wax (Kusumoto Chemicals, Ltd.)
[(5)]Vinyltrimethoxysilane (Momentive Performance Materials Inc.)
[(6)]N-(2-aminoethyl)-3-aminopropyltrimethoxysilane (Momentive Performance Materials Inc.)
[(7)]Dibutyltin bis(acetylacetonate) (Nitto Kasei Co., Ltd.)
[(8)]Dibutyltin dilaurate (Nitto Kasei Co., Ltd.)

From the results in Tables 1 and 2, comparisons between Examples 1 to 5 and Comparative Examples 1 to 6 show that curable compositions containing a specific amount of a plasticizer and the polymer (A-1), (A-2) or (A-3) in the present invention, which had a specific molecular weight and also contained at least 1.3 reactive silyl groups per molecule, yielded cured products having higher hardness than that of the curable compositions in the comparative examples. Moreover, these curable compositions were also found to be highly thixotropic. It was also demonstrated that the crack resistance of a brittle material such as a glass plate can be improved.

Example 6

A total of 100 parts by weight of the polymer (A-1) (50 parts by weight) and the polymer (B-4) (50 parts by weight) was mixed and thoroughly kneaded with the following: 20 parts by weight of isodecyl phthalate (J-PLUS Co., Ltd., product name: DIDP), 50 parts by weight of fatty acid-treated precipitated calcium carbonate (Shiraishi Kogyo Kaisha, Ltd., product name: Hakuenka CCR), 200 parts by weight of heavy calcium carbonate (SHIRAISHI CALCIUM KAISHA, LTD., product name: Whiton SB Red), and 2 parts by weight of a thixotropic agent (Kusumoto Chemicals, Ltd., product name: DISPARLON 6500). This was followed by dispersion by a single passage through a three-roll paint mill to prepare a composition.

(Evaluation)

The viscosity ratio, hardness, and tensile properties were determined on the obtained composition using the following methods.

(Viscosity Ratio)

In an atmosphere of 23° C. and 50% relative humidity, the viscosity was measured with a BS-type viscometer using a No. 7 rotor (Toki Sangyo Co., Ltd.) at 2 rpm and 10 rpm in order to determine the viscosity ratio between that at 2 rpm and that at 10 rpm, which is indicative of thixotropy. The results are given in Table 3.

(Hardness)

In an atmosphere of 23° C. and 50% relative humidity, to the composition were added 2 parts by weight of vinyltrimethoxysilane (Momentive Performance Materials Inc., product name: A-171), 3 parts by weight of N-(2-aminoethyl)-3-aminopropyltrimethoxysilane (Momentive Performance Materials Inc., product name: A-1122), and 2 parts by weight of dibutyltin bis(acetylacetonate) (Nitto Kasei Co., Ltd.) as condensation catalyst each relative to 100 parts by weight in total of the polymers (A-1) and (B-4), and they were thoroughly mixed. Using a spatula, the mixture was filled into a mold having a thickness of about 8 mm, and the surface was made flat. After 3 days, the hardness of the resulting cured product was measured using a type A durometer according to JIS K 6253. The results are given in Table 3.

(Tensile Properties)

In an atmosphere of 23° C. and 50% relative humidity, to the composition were added 2 parts by weight of vinyltrimethoxysilane (Momentive Performance Materials Inc., product name: A-171), 3 parts by weight of. N-(2-aminoethyl)-3-aminopropyltrimethoxysilane (Momentive Performance Materials Inc., product name: A-1122), and 2 parts by weight of dibutyltin bis(acetylacetonate) (Nitto Kasei Co., Ltd.) as condensation catalyst each relative to 100 parts by weight in total of the polymers (A-1) and (B-4), and they were thoroughly mixed. The mixture was filled into a 3 mm-thick polyethylene mold so as not to trap air bubbles, and then cured for 3 days at 23° C. and 50% relative humidity and then for 4 days at 50° C. to give a cured product. A #3 dumbbell was punched from the obtained cured product according to JIS K 6251 and then subjected to tensile testing (tensile rate 200 mm/minute, 23° C., 50% relative humidity) to measure elongation at break. The results are given in Table 3.

Examples 7 and 8 and Comparative Examples 7 and 8

Compositions were obtained by following the same procedure as in Example 6 but using the components in the proportions given in Table 3, and then the evaluations were performed.

TABLE 3

| Composition (parts by weight) | | Example 6 | Example 7 | Example 8 | Comparative Example 7 | Comparative Example 8 |
|---|---|---|---|---|---|---|
| Polymer (A) | A-1 | 50 | | | | |
| | A-2 | | 50 | 50 | | |
| Polymer (B) | B-2 | | | 50 | 100 | |
| | B-4 | 50 | 50 | | | 100 |
| Plasticizer (C) | DIDP[1] | 20 | 20 | 20 | 20 | 20 |
| Filler | Hakuenka CCR[2] | 50 | 50 | 50 | 50 | 50 |
| Pigment | Whiton SB Red[3] | 200 | 200 | 200 | 200 | 200 |
| Thixotropic agent | DISPARLON #6500[4] | 2 | 2 | 2 | 2 | 2 |
| Dehydrating agent | A-171[5] | 2 | 2 | 2 | 2 | 2 |
| Adhesion promoter | A-1122[6] | 3 | 3 | 3 | 3 | 3 |
| Condensation catalyst | U-220H[7] | 2 | 2 | 2 | 2 | 2 |
| | Viscosity ratio | 4.0 | 4.0 | 4.3 | 3.4 | 3.3 |
| Shore A hardness | After 3 days | 60 | 70 | 65 | 45 | 55 |
| #3 Dumbbell tensile test | TB (MPa) | 2.0 | 2.5 | 2.2 | 1.6 | 1.8 |

[1] Isodecyl phthalate (J-PLUS Co., Ltd.)
[2] Fatty acid-treated precipitated calcium carbonate (Shiraishi Kogyo Kaisha, Ltd.)
[3] Heavy calcium carbonate (SHIRAISHI CALCIUM KAISHA, LTD.)
[4] Fatty acid amide wax (Kusumoto Chemicals, Ltd.)
[5] Vinyltrimethoxysilane (Momentive Performance Materials Inc.)
[6] N-(2-aminoethyl)-3-aminopropyltrimethoxysilane (Momentive Performance Materials Inc.)
[7] Dibutyltin bis(acetylacetonate) (Nitto Kasei Co., Ltd.)

From the results in Table 3, comparisons between Examples 6 to 8 and Comparative Examples 7 and 8 show that curable compositions containing the polymer in the present invention, which had a specific molecular weight and also contained at least 1.3 reactive silyl groups per molecule, yielded cured products having higher hardness and higher strength than those of the curable compositions in the comparative examples. In addition, these curable compositions were highly thixotropic.

INDUSTRIAL APPLICABILITY

The curable composition of the present invention can be used in applications such as adhesives, flooring adhesives, tile adhesives, coating agents, pressure-sensitive adhesives, impression materials, vibration-proof materials, damping materials, soundproof materials, expanded/foamed materials, paints, and spray coatings. The cured product obtained by curing the curable composition of the present invention is more preferably applied to wood flooring adhesives and tile adhesives, which require high hardness in particular. The hardness of the cured product determined with a type A durometer is preferably at least 60, and more preferably at least 65. The use of the composition of the present invention for bonding to, for example, tiles, glass, decorative sheets or wood is preferred because the tiles and so forth are then resistant to cracking. In addition, the composition of the present invention is suitable for crack repair materials for concrete.

The curable composition of the present invention can also be used in various applications such as electric and electronic part materials (e.g. solar cell backside sealants); electrical insulating materials (e.g. insulating coating materials for electric wires and cables); elastic adhesives; contact adhesives; spray sealants; crack repair materials; tile adhesives; powder coating compositions; casting materials; rubber materials for medical use; pressure-sensitive adhesives for medical use; sealing materials for medical devices; food packaging materials; joint sealing materials for siding boards and other exterior materials; primers; electromagnetic-wave-shielding conductive materials; thermally conductive materials; hot melt materials; potting agents for electrics and electronics; films; gaskets; various molding materials; rustproof and waterproof encapsulants for wired glass and laminated glass edges (cut end faces); and liquid sealants for use in automotive parts, electrical machinery parts, various machinery parts and the like. Further, the curable composition can also be used as various sealing compositions and adhesive compositions because it, either alone or with the aid of a primer, can adhere to a wide range of substrates such as glass, ceramics, wood, metals, and resin moldings. In addition, the curable composition of the present invention can also be used for adhesives for interior panels, adhesives for exterior panels, stone pitching adhesives, ceiling finishing adhesives, floor finishing adhesives, wall finishing adhesives, vehicle panel adhesives, and adhesives for electric/electronic/precision device assembling.

The invention claimed is:

1. A curable composition, comprising:

100 parts by weight of a reactive silyl group-containing organic polymer (A) that has a number average molecular weight of 2,000 to 6,000 and contains 2.1 to 3 reactive silyl groups per molecule; and 0 to 40 parts by weight of a plasticizer (C).

2. The curable composition according to claim 1, wherein the backbone skeleton of the reactive silyl group-containing organic polymer (A) is a polyoxyalkylene polymer.

3. The curable composition according to claim 1, wherein the backbone structure of the reactive silyl group-containing organic polymer (A) has at least one branch.

4. The curable composition according to claim 1, which does not comprise the plasticizer (C).

5. An adhesive, comprising the curable composition according to claim 1.

6. A flooring adhesive, comprising the curable composition according to claim 1.

7. A tile adhesive, comprising the curable composition according to claim 1.

8. A coating agent, obtained by curing the curable composition according to claim 1.

9. A cured product, obtained by curing the curable composition according to claim 1.

10. A curable composition, comprising:
   100 parts by weight of a reactive silyl group-containing organic polymer (A) that has a number average molecular weight of 2,000 to 6,000 and contains 1.3 to 5 reactive silyl groups per molecule;
   a reactive silyl group-containing organic polymer (B) that has a number average molecular weight of 8,000 to 50,000 and contains 1.3 to 5 reactive silyl groups per molecule; and
   0 to 40 parts by weight of a plasticizer (C).

11. The curable composition according to claim 10, wherein the backbone skeleton of the reactive silyl group-containing organic polymer (B) is a polyoxyalkylene polymer.

12. The curable composition according to claim 10, wherein the backbone structure of the reactive silyl group-containing organic polymer (A) has at least one branch.

13. The curable composition according to claim 10, wherein the reactive silyl group-containing organic polymer (A) contains 2 to 5 reactive silyl groups per molecule.

14. The curable composition according to claim 10, which does not comprise the plasticizer (C).

15. An adhesive, comprising the curable composition according to claim 10.

16. A flooring adhesive, comprising the curable composition according to claim 10.

17. A tile adhesive, comprising the curable composition according to claim 10.

18. A coating agent, obtained by curing the curable composition according to claim 10.

19. A cured product, obtained by curing the curable composition according to claim 10.

20. The curable composition according to claim 10, wherein the backbone skeleton of the reactive silyl group-containing organic polymer (A) is a polyoxyalkylene polymer.

* * * * *